(12) United States Patent
Berns et al.

(10) Patent No.: US 7,605,943 B2
(45) Date of Patent: *Oct. 20, 2009

(54) PRODUCTION OF A COLOR CONVERSION PROFILE UTILIZING COMPARISON OF SPECTRAL REFLECTANCE DATA AND COMPARATIVE COLORS

(75) Inventors: Roy S. Berns, Pittsford, NY (US);
Lawrence A. Taplin, Rochester, NY (US); Yoshifumi Arai, Nagano-ken (JP); Michinao Osawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 592 days.

This patent is subject to a terminal disclaimer.

(21) Appl. No.: 10/570,420

(22) PCT Filed: Nov. 2, 2004

(86) PCT No.: PCT/US2004/036703

§ 371 (c)(1),
(2), (4) Date: Mar. 1, 2006

(87) PCT Pub. No.: WO2005/043889

PCT Pub. Date: May 12, 2005

(65) Prior Publication Data

US 2006/0285742 A1 Dec. 21, 2006

Related U.S. Application Data

(60) Provisional application No. 60/517,236, filed on Nov. 3, 2003.

(51) Int. Cl.
*G06F 15/00* (2006.01)

(52) U.S. Cl. ......................... 358/1.9; 358/3.23; 358/518; 382/167

(58) Field of Classification Search ................... 358/1.9, 358/3.23, 518; 382/167
See application file for complete search history.

(56) References Cited

U.S. PATENT DOCUMENTS 5,619,348 A * 4/1997 Tokai .......................... 358/518

(Continued)

FOREIGN PATENT DOCUMENTS

EP 1 119 187 7/2001

(Continued)

OTHER PUBLICATIONS

Abstract of Japanese Patent Publication No. 61-050153, Pub. Date: Mar. 12, 1986, Patent Abstracts of Japan.

(Continued)

*Primary Examiner*—Mark K Zimmerman
*Assistant Examiner*—Javier J Ramos
(74) *Attorney, Agent, or Firm*—Martine Penilla & Gencarella, LLP

(57) ABSTRACT

A method and apparatus for producing a color conversion profile for use in a color inkjet printer, a color laser printer, or the like. In one embodiment, a spectral printing model converter is used to sample ink amount data to spectral reflectance Rsmp($\lambda$). Using this spectral reflectance Rsmp($\lambda$), colorimetric values CV1, CV2 under two different viewing conditions are calculated, and an evaluation index EI that includes an index of color difference between the colorimetric values CV1, CV2 is calculated. I another embodiment, an evaluation index EI that includes an index of color difference between sample color represented by sample ink amount data and reference color obtained from a reference color patch is calculated. Sample ink amount data having the best evaluation index EI is then selected as a representative sample. Profiles are created from the plurality of selected representative samples.

6 Claims, 16 Drawing Sheets

U.S. PATENT DOCUMENTS

| | | | |
|---|---|---|---|
| 5,907,495 A * | 5/1999 | Snyder et al. | 703/6 |
| 5,929,906 A | 7/1999 | Arai et al. | |
| 6,542,634 B1 * | 4/2003 | Ohga | 382/167 |
| 7,053,910 B2 | 5/2006 | Newman | |
| 7,298,513 B2 | 11/2007 | Namikata | |
| 2003/0098896 A1 * | 5/2003 | Berns et al. | 347/15 |
| 2003/0210395 A1 * | 11/2003 | Takahashi et al. | 356/405 |
| 2003/0234943 A1 * | 12/2003 | Van Bael | 358/1.9 |
| 2005/0094169 A1 * | 5/2005 | Berns et al. | 358/1.9 |
| 2005/0094871 A1 * | 5/2005 | Berns et al. | 358/1.9 |

FOREIGN PATENT DOCUMENTS

| | | |
|---|---|---|
| JP | 61-050153 | 3/1986 |
| JP | 11-261740 | 9/1999 |
| JP | 2001-320592 | 11/2001 |
| JP | 2002-354276 | 12/2002 |
| JP | 2003-153015 | 5/2003 |
| JP | 2003-153024 | 5/2003 |
| JP | 2003-303085 | 10/2003 |
| WO | WO 02/100959 | 12/2002 |

OTHER PUBLICATIONS

Y. Arai et al., "Device-and-illuminant independent color reproduction using principal component analysis and neural networks," *Proc. SPIE*, 1995, SPIE vol. 2414, pp. 115-122.

Y. Arai et al., A neural network method for correcting the color shifts due to illuminant changes, *Proc. ICONIP*, 1996, vol. 1, pp. 350-355.

Y. Arai et al., "Color Correction Method Based on the Spectral Reflectance Estimation using a Neural Network," *Proc. Fourth Color Imaging Conf.: Color Science, Systems and Applications*, 1996, pp. 5-9.

Y. Arai et al., "A Color Conversion Method Using a Neural Network for a Cross-Media Color Appearance Matching," *Proc. of AIC Color 97*, 1997, vol. II, pp. 566-569.

Y. Chen et al., "A Multi-Ink Color-Separation Algorithm Maximizing Color Constancy," *IS&T/SID 11th Color Imaging Conf.*, 2003, pp. 277-281.

M.R. Rosen et al., "Spectral Redundancy in a 6-Ink Ink-Jet Printer," *Proc. IS&T's 2003 PICS Conf.*, 2003, pp. 236-243.

Abstract of Japanese Patent Publication No. 11-261740, Pub. Date: 24 Sep. 1999, Patent Abstracts of Japan.

Abstract of Japanese Patent Publication No. 2001-320592, Pub. Date: 16 Nov. 2001, Patent Abstracts of Japan.

Abstract of Japanese Patent Publication No. 2002-354276, Pub. Date: 06 Dec. 2002, Patent Abstracts of Japan.

Abstract of Japanese Patent Publication No. 2003-153015, Pub. Date: 23 May 2003, Patent Abstracts of Japan.

Abstract of Japanese Patent Publication No. 2003-153024, Pub. Date: 23 May 2003, Patent Abstracts of Japan.

Abstract of Japanese Patent Publication No. JP 2003-303085, Pub. Date: Oct. 24, 2003, Patent Abstracts of Japan.

\* cited by examiner

Fig.1 FIRST EMBODIMENT

Non-uniform interpolation

Before non-uniform interpolation

After non-uniform interpolation

Comparison of $\Delta E_{00}$ color differences between original target and reproduction by CMYKcm and CMYKGO printers Fig. 8 Color inconstancy index comparison between original target and reproductions by CMYKcm and CMYKGO printers Spectral Neugebauer model $$R(\lambda) = a_w R_w(\lambda) + a_c R_c(\lambda) + \cdots + a_k R_k(\lambda)$$
$$a_w = (1-f_c)(1-f_m)(1-f_y)$$
$$a_c = f_c(1-f_m)(1-f_y)$$
$$a_m = (1-f_c)f_m(1-f_y)$$
$$a_y = (1-f_c)(1-f_m)f_y$$
$$a_r = (1-f_c)f_m f_y$$
$$a_g = f_c(1-f_m)f_y$$
$$a_b = f_c f_m(1-f_y)$$
$$a_k = f_c f_m f_y$$

Murray-Davies model $$f_c = f_{\text{1D-LUT}}(d_c)$$

Cell division in
Cellular Yule-Nielsen Spectral Neugebauer Model

Ink area coverage fc(d)

Calculation of $Rsmp(\lambda)$ $$Rsmp(\lambda) = \left(\sum a_i R_i(\lambda)^{1/n}\right)^n$$

$$= \left(a_{11}R_{11}(\lambda)^{1/n} + a_{12}R_{12}(\lambda)^{1/n} + a_{21}R_{21}(\lambda)^{1/n} + a_{22}R_{22}(\lambda)^{1/n}\right)^n$$

Selected digital counts and area coverages of every ink for Cellular Yule-Nielsen Spectral Neugebauer Model

|  | Digital counts of ink amount | | | |
|---|---|---|---|---|
| Cyan | 0 | 50 | 168 | 255 |
| Magenta | 0 | 56 | 173 | 255 |
| Yellow | 0 | 49 | 162 | 255 |
| Black | 0 | 56 | 126 | 255 |
| Green | 0 | 43 | 182 | 255 |
| Orange | 0 | 64 | 186 | 255 |

$R(\lambda) = \{a_w R_w(\lambda)^{1/n} + a_c R_c(\lambda)^{1/n} + a_m R_m(\lambda)^{1/n} + a_b R_b(\lambda)^{1/n}\}^n$ $a_w = (1-f_c)(1-f_m)$
$a_c = f_c(1-f_m)$
$a_m = (1-f_c)f_m$
$a_b = f_c f_m$

PRODUCTION OF A COLOR CONVERSION PROFILE UTILIZING COMPARISON OF SPECTRAL REFLECTANCE DATA AND COMPARATIVE COLORS

CROSS-REFERENCE TO RELATED APPLICATIONS

Priority is claimed from Provisional Patent Application No. 60/517,236, filed Nov. 3, 2003, the disclosure which is hereby incorporated herein by reference in its entirety.

FIELD OF THE INVENTION

The present invention relates to a method and apparatus for producing a color conversion profile for use in a color ink jet printer, a color laser printer, or the like, as well as a printer using such a color conversion profile.

BACKGROUND OF THE INVENTION

In recent years, the use of color ink-jet printer and color laser printers has become widespread. A color printer uses a color conversion lookup table to convert input color image data into corresponding amounts of inks of plural colors. In the conventional method for creating a color conversion lookup table, (i) a plurality of sample color patches are printed, (ii) colors of the color patches are measured to obtain their colorimetric values, and (ii) a lookup table that represents correspondence relationships between color patch colorimetric values and the amounts of ink used to print the color patches is created.

However, colorimetric values are dependent upon viewing conditions during color measurement. Accordingly, where a color conversion lookup table has been created so as to give a printout having good color reproduction under a certain viewing condition, it will not necessarily be the case that printouts created using that color conversion lookup table will afford good color reproduction under other viewing conditions. Accordingly, there has for some time existed a need for a color conversion lookup table which enables good color reproduction under various viewing conditions. There has also been a need, when creating a reproduction of a painting or drawing for example, to create a color conversion lookup table that can reproduce as faithfully as possible the color appearance of the original. Such requirements are not limited just to color conversion lookup tables, but are generally desirable in all manner of profiles used for color conversion.

SUMMARY OF THE INVENTION

Accordingly, the present invention provides a method and apparatus for producing a color conversion profile capable of achieving good color reproduction under various viewing conditions. The invention also provides a method and apparatus for producing a color conversion profile for reproducing as faithfully as possible the color appearance of an original.

More specifically, the invention provides a method of producing a profile defining correspondence between colorimetric value data and ink amount data representing a set of ink amounts of plural inks usable by a printer. The method comprises: (a) providing a spectral printing model converter configured to convert ink amount data to spectral reflectance of a color patch to be printed according to the ink amount data; (b) providing a plurality of sample ink amount data each representing a set of ink amounts of plural inks; (c) converting each sample ink amount data into spectral reflectance of a sample patch to be printed with the ink amounts represented by the sample ink amount data using the spectral printing model converter; (d) calculating an evaluation index for each sample ink amount data, the evaluation index including a color difference index representing a color difference between a sample color which is calculated from the spectral reflectance and a comparative color which is selected as a basis for comparison; (e) selecting plural sample ink amount data based on the evaluation index; and (f) producing a profile defining correspondence between colorimetric value data and ink amount data based on the selected plural sample ink amount data. The plural inks preferably include one or more spot color inks.

According to this method, by calculating appropriate evaluation indices it is possible to produce a color profile that achieves good color reproduction under various viewing conditions, as well as to produce a color profile capable of reproducing as faithfully as possible the color appearance of an original.

The evaluation index may be one including a color inconstancy index, or one including a metamerism index. When an evaluation index that includes a color inconstancy index is used, it is possible to produce a color profile that achieves good color reproduction under various viewing conditions. On the other hand, when a metamerism index is used, it is possible to produce a color profile capable of reproducing as faithfully as possible the color appearance of an original. The metamerism index represents a color difference evaluation index CDI representing color difference between two colors. The color inconstancy index also represents a color difference evaluation index CDI representing the color difference of a single sample viewed under two viewing conditions.

The present invention may take the form of any of a number of different embodiments, for example, a profile production method and profile production device, a printing method and printing apparatus using a profile, a computer program for realizing the functions of such a method or device, a storage medium having such a computer program recorded thereon, and a data signal including such a computer program and embodied in a carrier wave.

BRIEF DESCRIPTION OF THE DRAWINGS

FIG. 15 shows cell division grid coordinates in the Cellular Yule-Nielsen Spectral Neugebauer model.

DETAILED DESCRIPTION

The embodiments of the invention will be described in the following order.
A. Embodiment 1
B. Embodiment 2
C. Embodiment 3
D. Example of Spectral Printing Model
E. Variant Examples

A. EMBODIMENT 1

Figure 1:
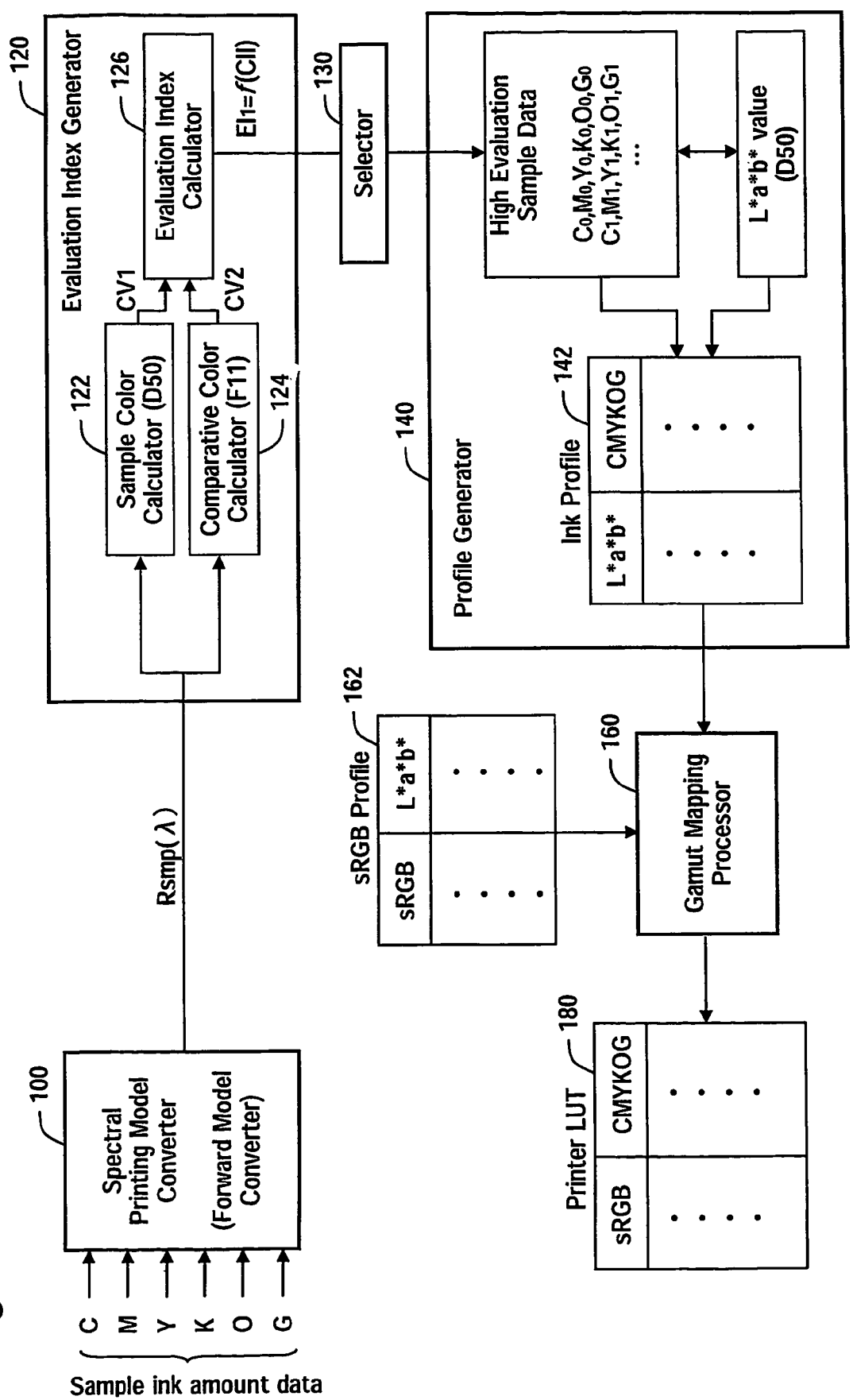
FIG. 1 is a block diagram showing the overall system arrangement in Embodiment 1 of the invention.

FIG. 1 is a block diagram of a system in accordance with preferred embodiments of the present invention. The system comprises a spectral printing model converter 100, an evaluation index generator 120, a selector 130, a profile generator 140, and a gamut mapping processor 160, although the system could be comprised of other numbers and types of components in other configurations. Spectral printing model converter 100 converts ink amount data into spectral reflectance Rsmp($\lambda$) of a color patch to be printed according to the ink amount data. The term "color patch" herein is not limited to chromatic colors, but is used in a broad sense to include achromatic colors as well. In this embodiment, assuming a color printer that can use six colors of ink, namely, cyan (C), magenta (M), yellow (Y), black (K), orange (O), and green (G), spectral printing model converter 100 has as inputs ejection amounts of these six inks. The spectral printing model will be described in greater detail in Section D. Hereinafter, "spectral printing model" will also be referred to as "forward model."

Evaluation index generator 120 includes a sample color calculator 122, a comparative color calculator 124, and an evaluation index calculator 126 although evaluation index generator 120 can incorporate other types and numbers of elements in other combinations. Sample color calculator 122 uses the spectral reflectance Rsmp($\lambda$) for a sample ink amount data to calculate a colorimetric value CV1 under a first viewing condition. In this embodiment, illuminant D50 is used as this first viewing condition. A color represented by colorimetric value CV1 obtained under this first viewing condition is termed a "sample color." Comparative color calculator 124 uses the spectral reflectance Rsmp($\lambda$) for a sample ink amount data to calculate a colorimetric value CV2 under a second viewing condition. In this embodiment, illuminant F11 is used as this second viewing condition. Hereinafter, a color represented by colorimetric value CV2 obtained under the second viewing condition is sometimes referred to as a "comparative color."

As will be understood from the preceding description, in Embodiment 1 sample color calculator 122 and comparative color calculator 124 respectively calculate colorimetric values CV1, CV2 using the same spectral reflectance Rsmp($\lambda$), but under different viewing conditions. Using these colorimetric values CV1, CV2, evaluation index calculator 126 calculates an evaluation index $EI_1$ for determining the quality of the sample ink amount data. Specific examples of the evaluation index $EI_1$ will be described hereinbelow.

Selector 130 selects sample ink amount data having a good evaluation index $EI_1$. Profile generator 140 uses the selected sample ink amount data, together with colorimetric values (L*a*b* values) of color patches printed using the sample ink amount data, to create an ink profile 142. The ink profile 142 is in the form of a lookup table indicating correspondence relationships between colorimetric values (L*a*b* values) and CMYKOG ink amounts. "Ink profile" may be referred to as "output device profile" as well. "Profile" herein refers to a specific embodiment of a set of conversion rules for converting color space, and is used in a broad sense to include device profiles and lookup tables of various kinds.

Gamut mapping processor 160 uses the ink profile 142 and an input device profile 162, which has been prepared in advance, to create a printer lookup table 180. As the input device profile 162 there may be used, for example, of a profile for converting the sRGB color space to the L*a*b* color space. Printer lookup table 180 converts input color image data (e.g. sRGB data) to ink amount data.

Figure 2:
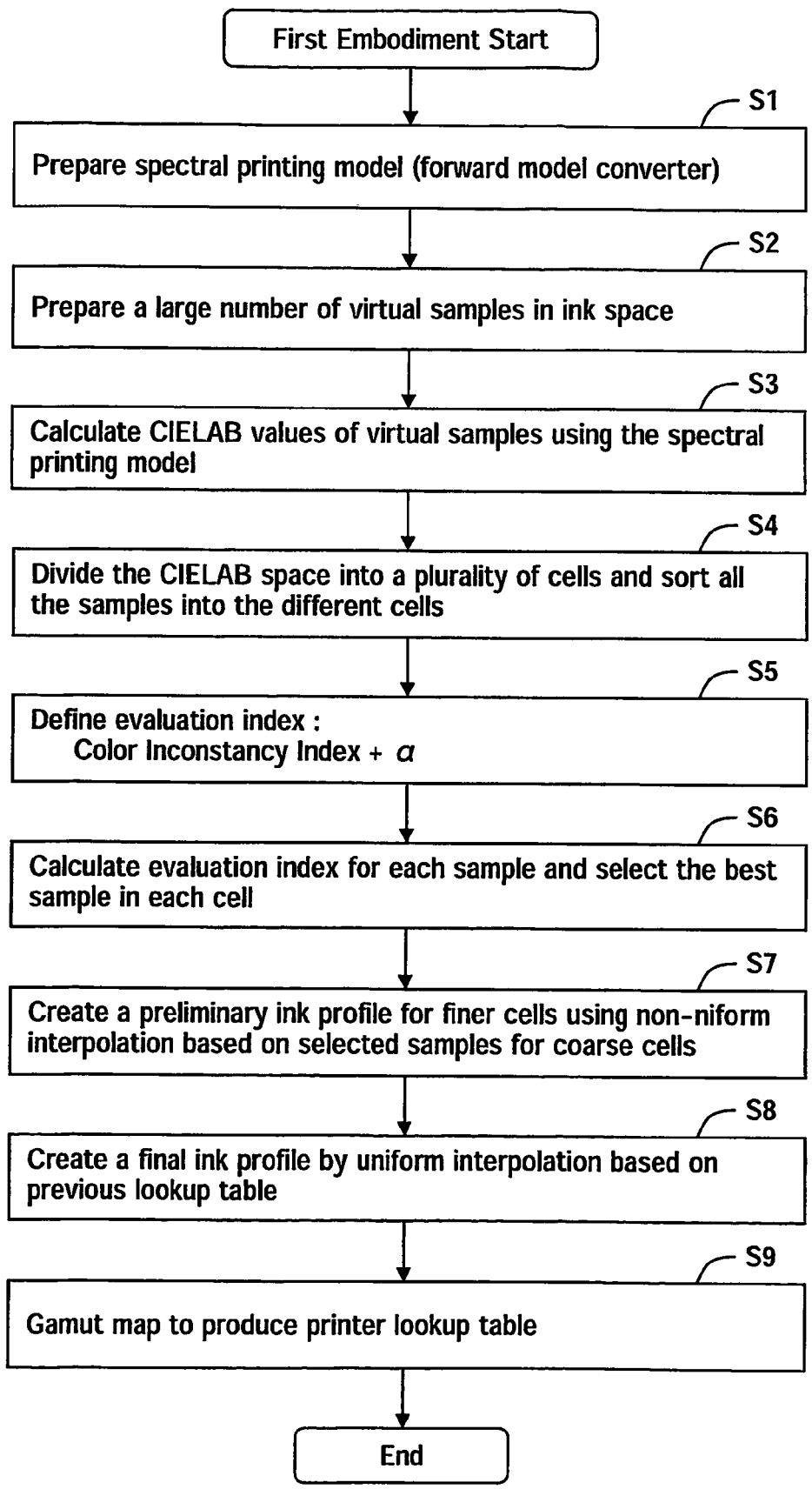
FIG. 2 is a flowchart illustrating the process flow in Embodiment 1.

FIG. 2 is a flowchart illustrating the process flow in Embodiment 1. In Step S1, a spectral printing model is determined and a converter 100 is created. In one working example, the Cellular Yule-Nielsen Spectral Neugebauer model is used as the spectral printing model. A detailed description is provided in Section D.

In Step S2, a large number of virtual samples are prepared. Here, "virtual sample" refers to provisional ink amount data used in the profile creation process, and to a virtual color patch to be printed according to this ink amount data. Hereinbelow, virtual samples are also referred to as simply "samples". In the working example, virtual samples (sample ink amount data) that combines amounts of all six inks were prepared, setting ink amounts at eleven points at 10% intervals within the range 0-100%. As a result, $11^6$ (=1,771,516 1,771,561) virtual samples were prepared. "100% ink amount" refers to the amount of ink providing solid coverage with a single ink.

Figure 3A:
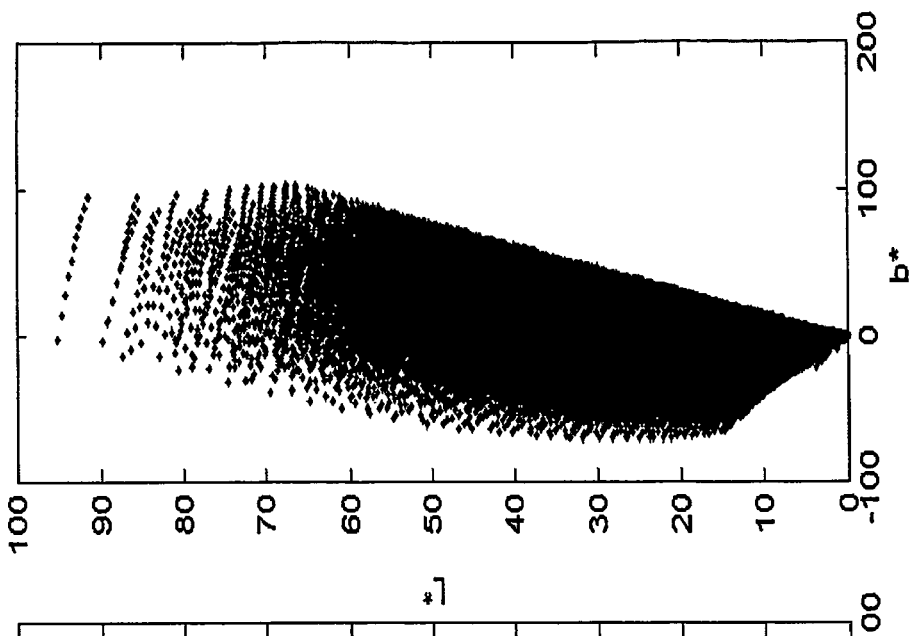
FIGS. 3(A)-3(C) are graphs showing sample colors in the CIELAB color space in a working example.
Figure 3B:
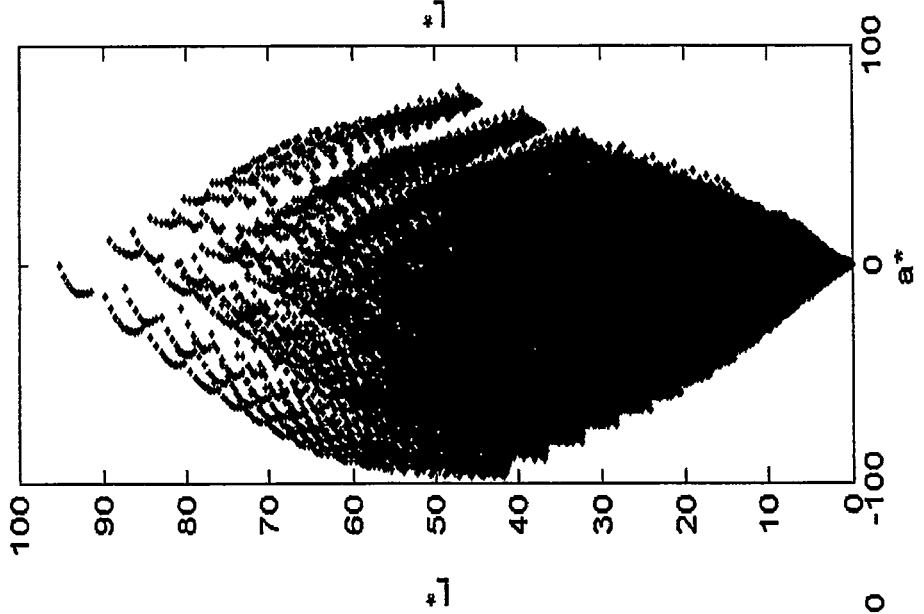
Figure 3C:
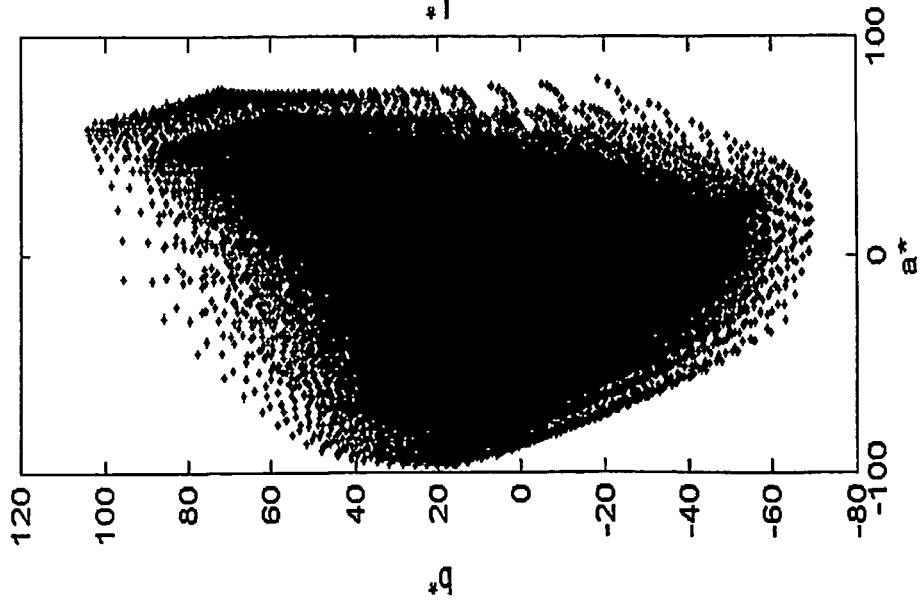

In Step S3, the sample ink amount data of the virtual samples is converted to spectral reflectance Rsmp($\lambda$) using spectral printing model converter 100, and colorimetric values L*a*b* in the CIELAB color system are calculated from this spectral reflectance Rsmp($\lambda$). In the working example, colorimetric values were calculated using the CIE illuminant D50 and CIE 1931 2° Standard Observer viewing condition. Hereinbelow, the color observed when a virtual sample is viewed under a certain viewing condition is termed "sample color." FIGS. 3(A)-3(C) are graphs showing sample colors in the CIELAB color space in the working example. In FIG. 3(A) the horizontal axis represents the a* axis of the CIELAB color space, and the vertical axis represents the b* axis. In FIGS. 3(B) and 3(C), the horizontal axis represents the a* axis and b*, and the vertical axis represents the L* axis. As will be understood from the above description, the $11^6$ sample colors are more densely concentrated where lightness L* is low and distributed sparsely up to the area of high lightness L*. A more uniform distribution of sample colors may be achieved inter alia by setting sample ink amount data to finer intervals in the range of relatively small ink amount and to coarser intervals in the range of relatively large ink amount.

In Step S4, the color space of the colorimetric values (here, the CIELAB color space) is divided into plural cells, and the plural sample colors are sorted in relation to the cells. In the working example, the CIELAB color space was divided equally into 16×16×16 cells.

In Step S5, an evaluation index $EI_1$ for use in selecting a good sample is defined. The evaluation index $EI_1$ used in Embodiment 1 is represented by the following Equation (1).

$$EI_1 = f(CII) = k \cdot CII + \alpha \quad (1)$$

Here, CII is the color inconstancy index, k is a coefficient, and α is another index.

CII may be represented by the following equation, for example.

$$CII = \left[\left(\frac{\Delta L^*}{2S_L}\right)^2 + \left(\frac{\Delta C^*_{ab}}{2S_C}\right)^2 + \left(\frac{\Delta H^*_{ab}}{S_H}\right)^2\right]^{1/2} \quad (2)$$

Here, $\Delta L^*$ denotes a lightness difference, $\Delta C^*_{ab}$ denotes a chroma difference, and $\Delta H^*_{ab}$ denotes a hue difference between CV1 and CV2. In calculating CII, CIELAB values of CV1 and CV2 have been converted to a common viewing condition, such as D65, using a chromatic adaptation transform (CAT) as described later with reference to FIG. 4. Regarding CII, see Billmeyer and Saltzman's Principles of Color Technology, 3rd edition, John Wiley & Sons Inc., 2000, p. 129, and pp. 213-215.

The right-hand term of Equation (2) corresponds to the color difference $\Delta E^*_{94(2:2)}$ obtained by the CIE 1994 Color Difference Equation, with values of the lightness and chroma variables $k_L$, $k_C$ set to 2, and the hue variable $k_H$ set to 1. In the CIE 1994 Color Difference Equation, the denominator coefficients $S_L$, $S_C$, $S_H$ of the right-hand term of Equation (2) are given by Equation (3) below.

$$S_L = 1$$

$$S_C = 1 + 0.045 C^*_{ab}$$

$$S_H = 1 + 0.015 C^*_{ab} \quad (3)$$

It is possible to use another equation as the color difference equation used for calculating CII.

The CII is defined as the difference in color appearance observed when a given color patch is viewed under first and second viewing conditions different from one another. Accordingly, a sample having a low CII is preferred in terms of less difference in apparent color when viewed under different viewing conditions.

In the working example, an evaluation index $EI_1$ given by Equation (4) below was used.

$$EI_1 = \frac{CII}{\max(CII)} + \frac{Tink}{6} \quad (4)$$

Here, max(CII) is the maximum value of CII for all samples. Tink is the total value of ink amount used by the sample. For example, where the ink amount for all six types of ink is set to 20%, the value of Tink/6 is 120%/6=0.2. The total ink amount Tink is used here to minimize total ink so as to result in cost savings. Accordingly, for a given value of CII, Equation (4) gives a better (i.e., smaller) evaluation index $EI_1$ the smaller the value of total ink amount Tink. The evaluation index $EI_1$ in Embodiment 1 is not limited to one given by Equation (1) or Equation (4); any function that includes CII may be used.

In Step S6 in FIG. 2, evaluation index generator 120 calculates an evaluation index $EI_1$ for each sample, and selector 130 selects the best sample in each cell of the CIELAB color space with reference to this evaluation index $EI_1$.

Figure 4:
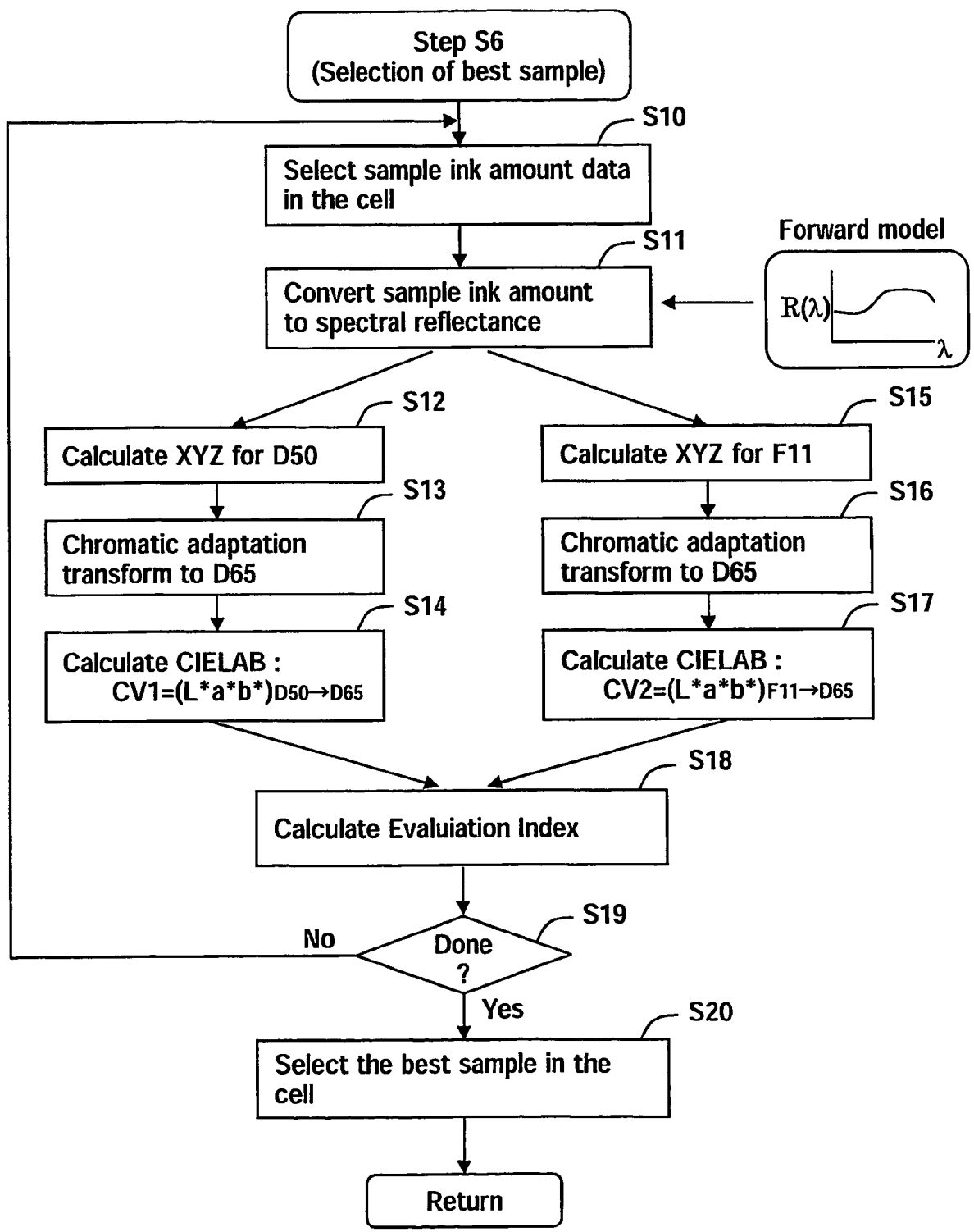
FIG. 4 is a flowchart showing in detail the procedure of Step S6 in FIG. 2.

FIG. 4 is a flowchart showing in detail the procedure of Step S6. In Step S10, one sample in a particular cell is selected. In Step S11, the spectral reflectance Rsmp(λ) of the sample is obtained using the spectral printing model converter 100. The next Steps S12-S14 are executed by the sample color calculator 122 (FIG. 1) of evaluation index generator 120; Steps S15-S17 are executed by comparative color calculator 124.

In Step S12, sample color calculator 122, using the spectral reflectance Rsmp(λ), calculates tristimulus values XYZ under a first viewing condition. In the working example, tristimulus values XYZ were calculated under the CIE illuminant D50, CIE 1931 2° Standard Observer viewing condition. "Viewing condition" herein refers to a combination of an illuminant and an observer; unless noted otherwise, the observer is the CIE 1931 2° Standard Observer. In Step S13, these tristimulus values XYZ are put through a chromatic adaptation transform to calculate the corresponding color under the standard viewing condition. In the working example, CIECAT02 was used as the chromatic adaptation transform, using illuminant D50 as the light source for the standard viewing condition. CIECAT02 is described, for example, in "The CIECAM02 Color Appearance Model", Nathan Moroncy et al., IS&T/SID Tenth Color Imaging Conference, pp. 23-27, and in "The Performance of CIECAM02", Changjun Li et al., IS&T/SID Tenth Color Imaging Conference, pp. 28-31. However, it is possible to use a different chromatic adaptation transform, such as the von Kries chromatic adaptation prediction model, as the chromatic adaptation transform. In Step S14, the colorimetric value of the corresponding color in the CIELAB color system CV1=$(L^*a^*b^*)_{D50 \to D65}$ is calculated. The subscript "D50→D65" denotes that this colorimetric value indicates color appearance under illuminant D50 and that it is represented by corresponding color under illuminant D65.

Comparative color calculator 124 executes calculations similar to sample color calculator 122, but under a second viewing condition. Specifically, in Step S15, it calculates tristimulus values XYZ under the second viewing condition using spectral reflectance Rsmp(λ). In the working example, tristimulus values XYZ were calculated under a viewing condition of the CIE illuminant F11 and CIE 1931 2° Standard Observer. In Step S16, the tristimulus values XYZ are put through a chromatic adaptation transform to calculate the corresponding color under the standard viewing condition. In Step S17, the colorimetric value of the corresponding color in the. CIELAB color system CV2=$(L^*a^*b^*)_{F11 \to D65}$ is calculated.

Since the colorimetric value of the sample color CV1=$(L^*a^*b^*)_{D50 \to D65}$ and the colorimetric value of the comparative color CV2=$(L^*a^*b^*)_{F11 \to D65}$ are the values of corresponding colors under the same standard viewing condition, the CII (see Equation (2) hereinabove) which represents the color difference ΔE between them accurately represents the difference in color appearance between the sample color and the comparative color.

The standard viewing condition is not limited to illuminant D65; viewing conditions under any illuminant can be used. For example, where illuminant D50 is employed as the standard viewing condition, Step S13 in FIG. 4 will not be necessary, and in Step S16 a chromatic adaptation transform for illuminant D50 will be performed. However, color difference ΔE calculated using the CIELAB color system gives the most reliable values when illuminant D65 is being used. For this reason, use of the illuminant D65 as the standard viewing condition is preferred.

In Step S18, evaluation index calculator 126 calculates an evaluation index $EI_1$ according to Equation (4) using the two colorimetric values CV1, CV2.

In Step S19, a determination is made as to whether calculation of evaluation index $EI_1$ for all sample colors included in the cell has been completed. By repeating Steps S10-S19 in this manner, evaluation indices $EI_1$ are calculated for all sample colors in the cell. In Step S20, selector 130 selects, from among the sample colors of the cell, the sample having the best evaluation index $EI_1$ as the representative sample for the cell. As a result, a single representative sample is selected for each cell that contains at least one sample. Hereinafter, this representative sample is also referred to as a "highly rated sample."

Of the plural cells divided up in Step S4, some cells will contain no sample colors whatsoever. Accordingly, the process of FIG. 4 is executed only on cells that contain at least one sample color, and excludes from the process cells that do not contain even one sample color.

In Step S7 of FIG. 2, profile generator 140 generates a preliminary ink profile by performing non-uniform interpolation based on representative samples. The preliminary ink profile is a color conversion lookup table for converting CIELAB colorimetric values into ink amounts. The prefix "preliminary" means that the profile relates to the relatively coarse cells divided up in Step S4.

Figure 5A:
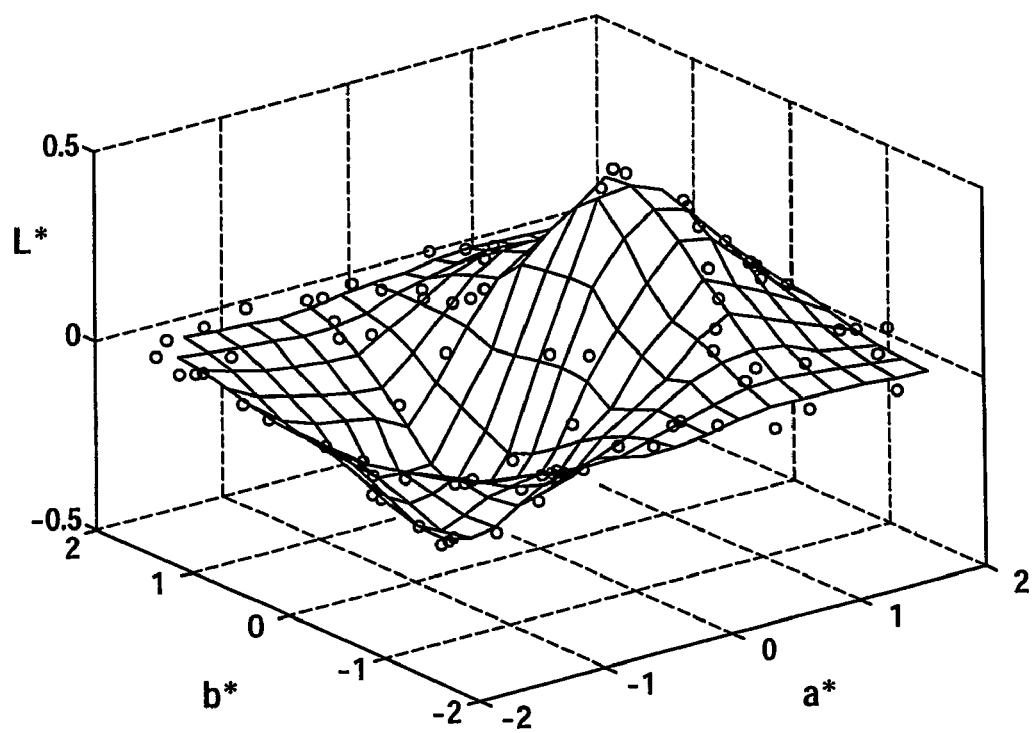
FIGS. 5(A)-5(C) illustrate non-uniform interpolation in Step S7.
Figure 5B:
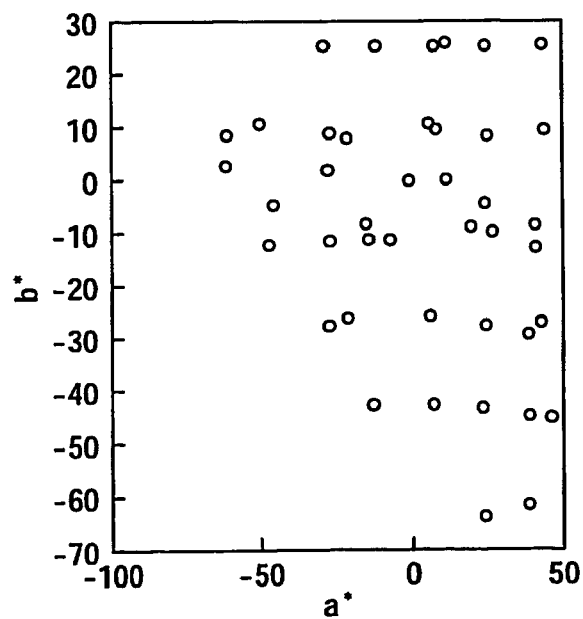
Figure 5C:
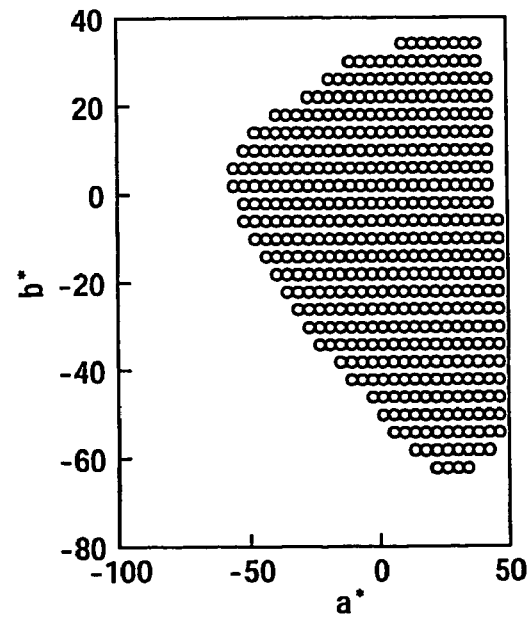

FIG. 5(A) illustrates non-uniform interpolation in Step S7. This figure shows the CIELAB color space; the circles in the figure indicate positions of representative sample colors, and the web pattern indicates a fine cell grid. In Step S7, ink amounts at grid points (web intersection points) are calculated by means of non-uniform interpolation of ink amounts for plural representative sample colors. FIGS. 5(B) and 5(C) respectively show an example of representative sample points before and after the non-uniform interpolation on the a* b* color plane at L*=23.8. Non-uniform interpolation may be carried out using the MATLAB™ (MathWorks Inc.) griddata function, for example. In the working example, the preliminary profile was created with input of 64×64×64 grid points of the CIELAB color space. The non-uniform interpolation may be executed by means of non-linear interpolation or linear interpolation. The non-linear interpolation tends to have higher precision and lower processing speed than the linear interpolation.

In Step S8, profile generator 140 generates a final ink profile 142 (FIG. 1) by means of linear interpolation of the preliminary profile. This final ink profile 142 has as input finer cell grid points than does the preliminary profile. In the working example, the final profile was created with input of 256×256×256 grid points of the CIELAB color space. As noted, the preliminary profile has as input 64×64×64 grid points of the CIELAB color space, and it is therefore a simple matter to produce the final ink profile 142 by means of linear interpolation. By generating a profile with input of 256×256×256 grid points of the CIELAB color space as the final ink profile 142, it is possible to quickly derive ink amounts corresponding to all CIELAB input values. Accordingly, the processing time required to subsequently create the lookup table can be reduced. However, it would also be possible to create the printer lookup table 180, described later, using the preliminary profile rather than final ink profile 142.

In Step S9, gamut mapping processor 160 (FIG. 1) performs gamut mapping on the basis of ink profile 142 and sRGB profile 162 to create a printer lookup table 180. The reason for performing gamut mapping is due to a difference between the gamut of the color space realizable in the printer (also termed "ink color space") and the gamut of the color space realizable in the input color space (in this embodiment, the sRGB color space). The gamut of the ink color space is defined by ink profile 142, while the gamut of the input color space is defined by sRGB profile 162. Since there are typically discrepancies between the input color space and the ink color space, it is necessary to map the gamut of the input color space to the gamut of the ink color space.

Figure 6B:
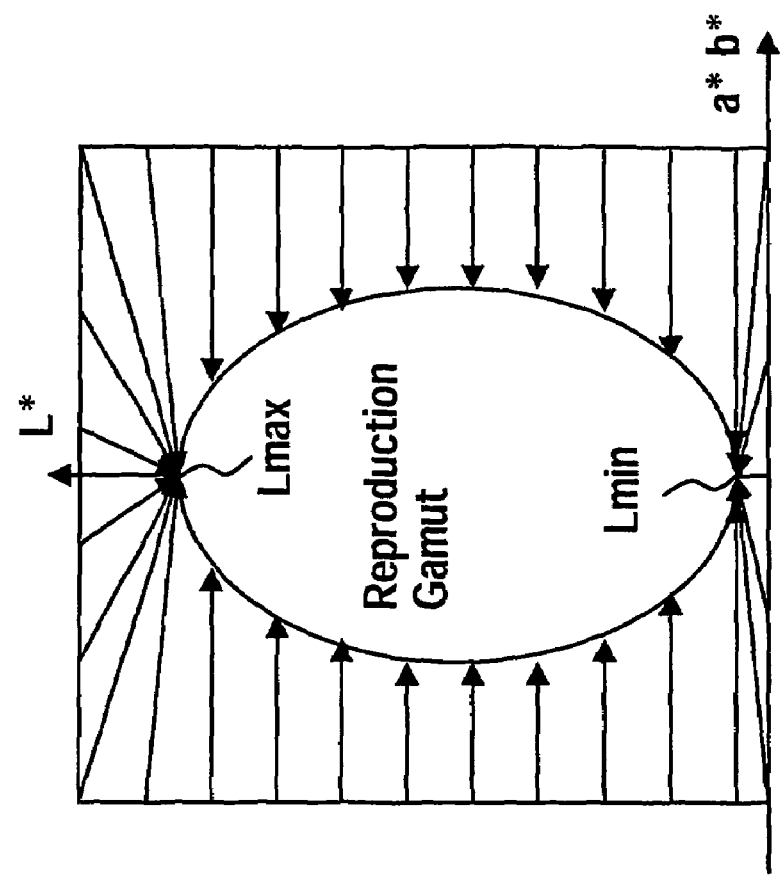
FIGS. 6(A) and 6(B) illustrate gamut mapping in Step S8.
Figure 6A:
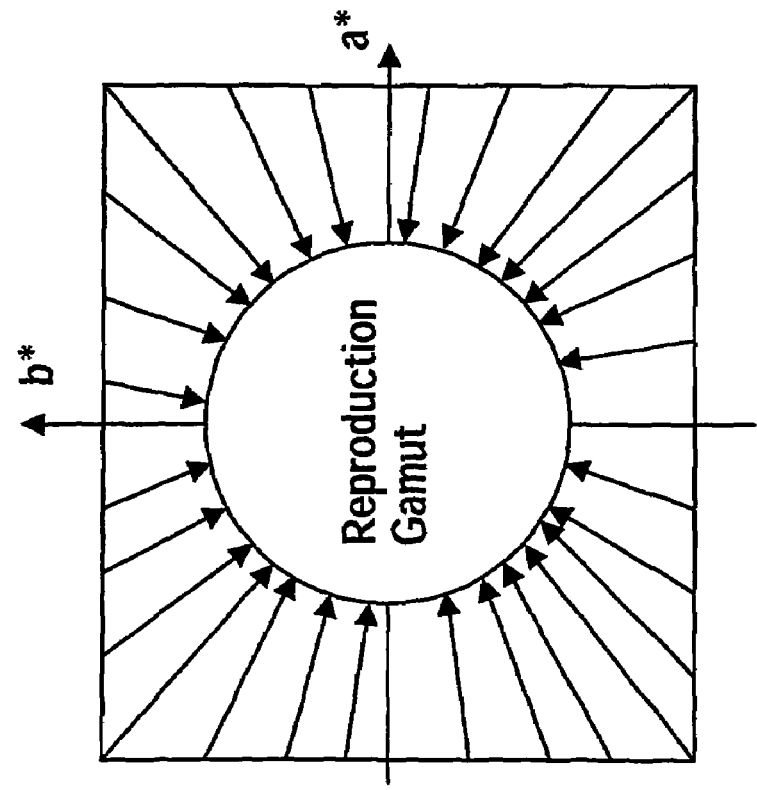

FIGS. 6(A) and 6(B) show an example of gamut mapping. Here, a method termed gamut clipping is employed. Specifically, as shown in FIG. 6(A), colors in the sRGB color space lying outside the gamut of the ink color space are mapped so as to reduce chroma while preserving hue. As regards lightness L*, for colors within the lightness range of the ink color space, lightness is preserved as-is. Colors having lightness greater than the maximum value for lightness Lmax of the ink color space are mapped to the maximum value Lmax. On the other hand, colors having lightness smaller than the minimum value for lightness Lmin are mapped to the minimum value Lmin. Various methods for gamut mapping are known, and any of these methods may be employed.

Once gamut mapping has been performed in this way, the final printer lookup table 180 is complete. The inputs to this lookup table 180 are sRGB data and the outputs ink amounts for six types of ink. By installing such a lookup table 180 in a printer, or in an associated printer driver resident on a computer, it is possible to produce printouts having minimal color inconstancy (i.e., little change in color appearance under different viewing conditions). In actual printing, the printer lookup table 180 converts given color image data (sRGB data) to ink amount data, and a halftone processor executes halftone processing of the ink amount data to produce print data representing dot formation states of plural inks. A print head ejects ink droplets in an amount according to the print data to reproduce a color printout.

Figure 7:
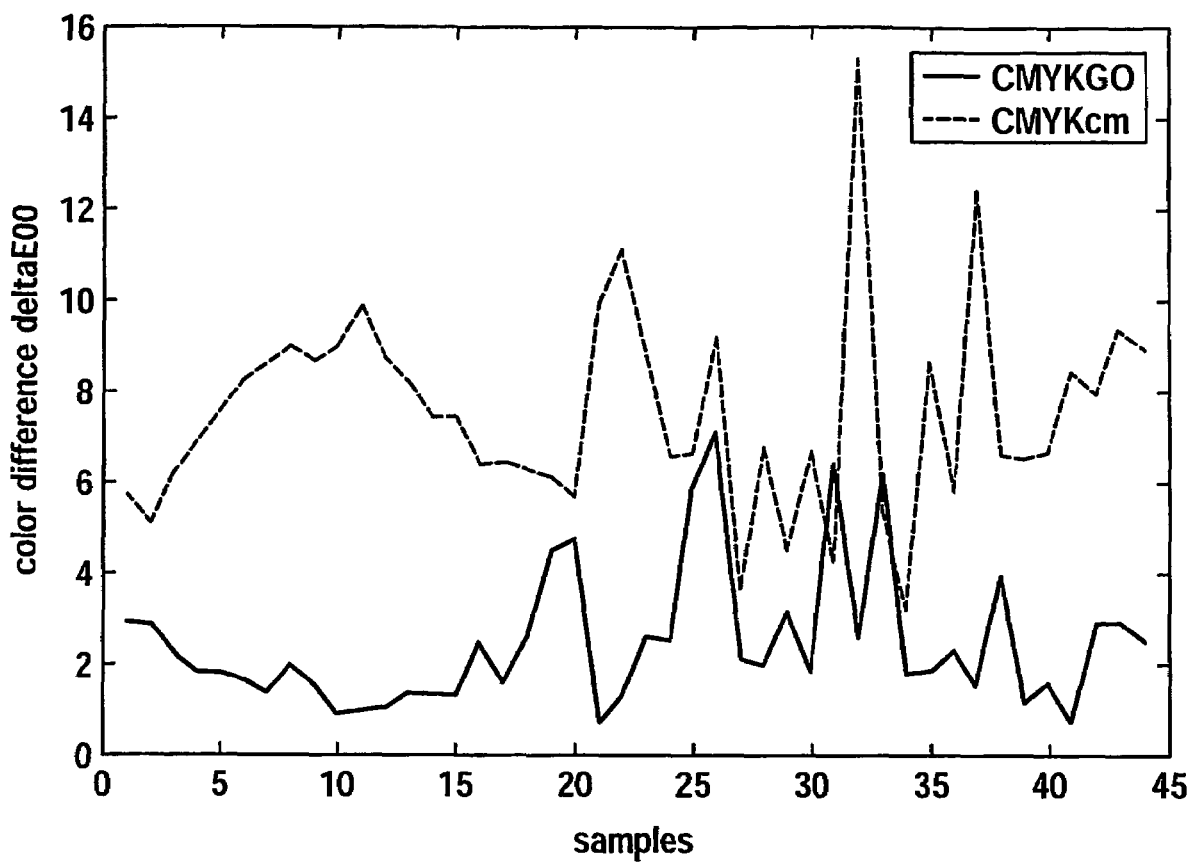
FIG. 7 is a graph showing color difference calculations in a working example and a comparative example.

FIG. 7 is a graph showing color difference calculations in the working example and a comparative example. The solid line indicates the color difference ΔE between original color patches and their reproductions printed by the CMYKGO printer of the working example. The broken line indicates the color difference ΔE between original color patches and their reproductions printed by a CMYKcm printer, as a comparative example. The CMYKcm printer is a six-color printer manufactured by Seiko-Epson Corporation that, in addition to the four inks CMYK, uses a light cyan ink c and a light magenta ink m. The horizontal axis in FIG. 7 gives the original color patch number. Here, 44 original color patches are used. The first 20 color patches are from the Kodak gray scale and the remaining 24 color patches are from the GretagMacbeth Color Checker Color Rendition Chart (trade name of Macbeth Inc.). When reproducing an original color patch in the printer, first, the spectral reflectance of the original color patch is measured, and the colorimetric value (CIELAB value) thereof is calculated. Next, the colorimetric value is input to the printer driver, and a patch is printed accordingly. During the test, ink amounts were obtained from colorimetric values (CIELAB values) using ink profile 142 instead of printer lookup table 180 (FIG. 1).

According to the results shown in FIG. 7, for substantially all color patches, there was less color difference between the original and reproduced patches with the CMYKGO printer of the working example than with the CMYKcm printer of the comparative example. The larger color differences for the CMYKcm printer were due to the fact that the generic color profile was used for the CMYKcm printer.

Figure 8:
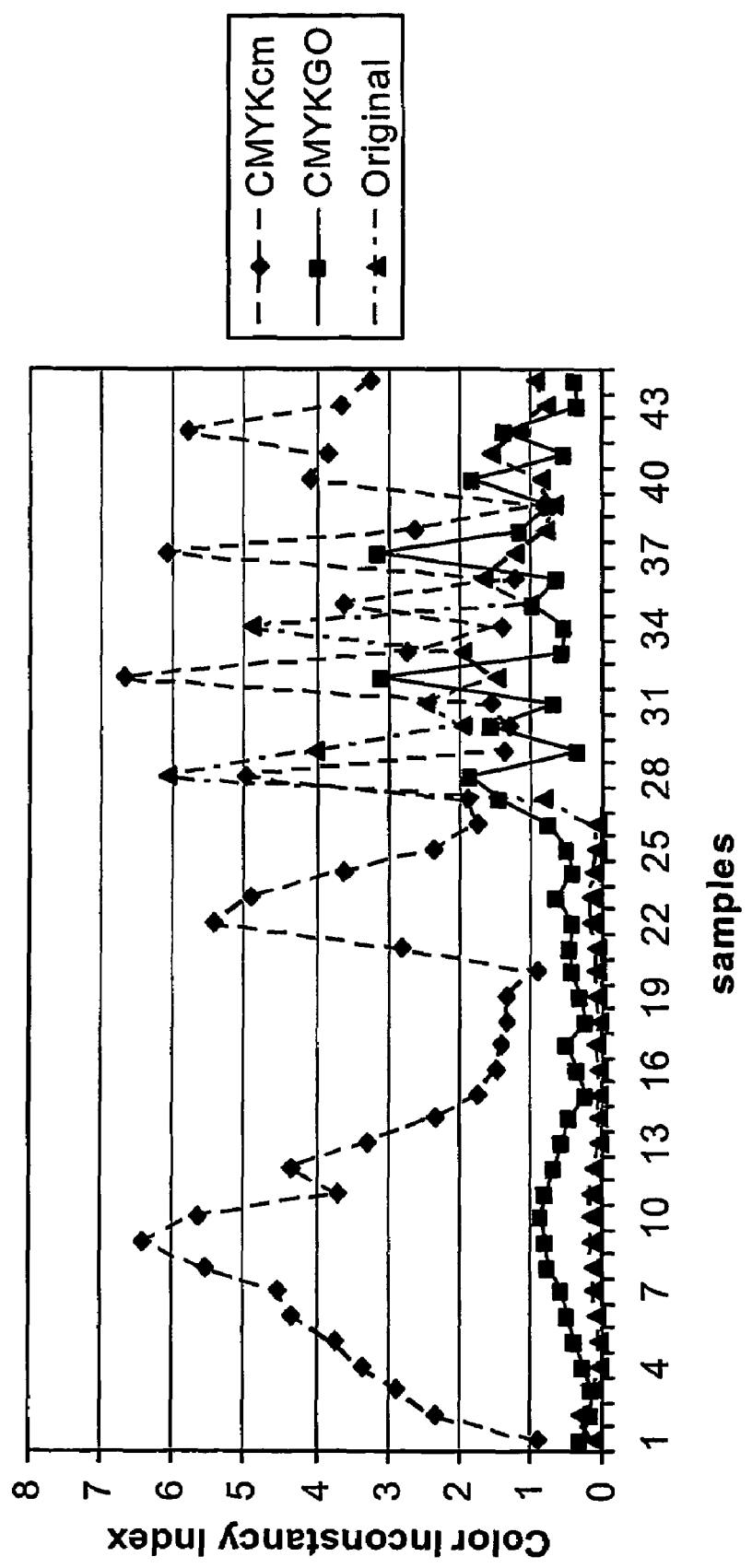
FIG. 8 is a graph showing color inconstancy index calculations in a working example and a comparative example.

FIG. 8 is a graph showing color inconstancy index calculations in the working example and the comparative example. The solid line indicates CII of color patches printed by the CMYKGO printer of the working example, and the dashed line indicates CII of color patches printed by the CMYKcm printer of the comparative example. The dotted-and-dashed line indicates CII of the original patch. The original color patches and color patches of the working example and comparative example are the same as in FIG. 7.

According to the results shown in FIG. 8, for substantially all color patches, CII was smaller with the CMYKGO printer of the working example than with the CMYKcm printer of the comparative example. Accordingly, the CMYKGO printer of the working example is able to produce printouts with less change in color appearance under different viewing conditions than is the CMYKcm printer of the comparative example. In the example of FIG. 8, color patches reproduced by the CMYKGO printer of the working example sometimes have smaller CII than the original patch. In view of this as well, it will be appreciated that the CMYKGO printer of the working example amply achieves the object of small color inconstancy.

In Embodiment 1 described hereinabove, using an evaluation index $EI_1$ that includes a CII (color inconstancy index), data having a high rating value is selected from among sample ink amount data, and an ink profile is created on the basis of the selected sample ink amount data. As a result, it is possible to create a color conversion profile able to produce a printout having little change in color appearance under different viewing conditions.

B. EMBODIMENT 2

Figure 9:
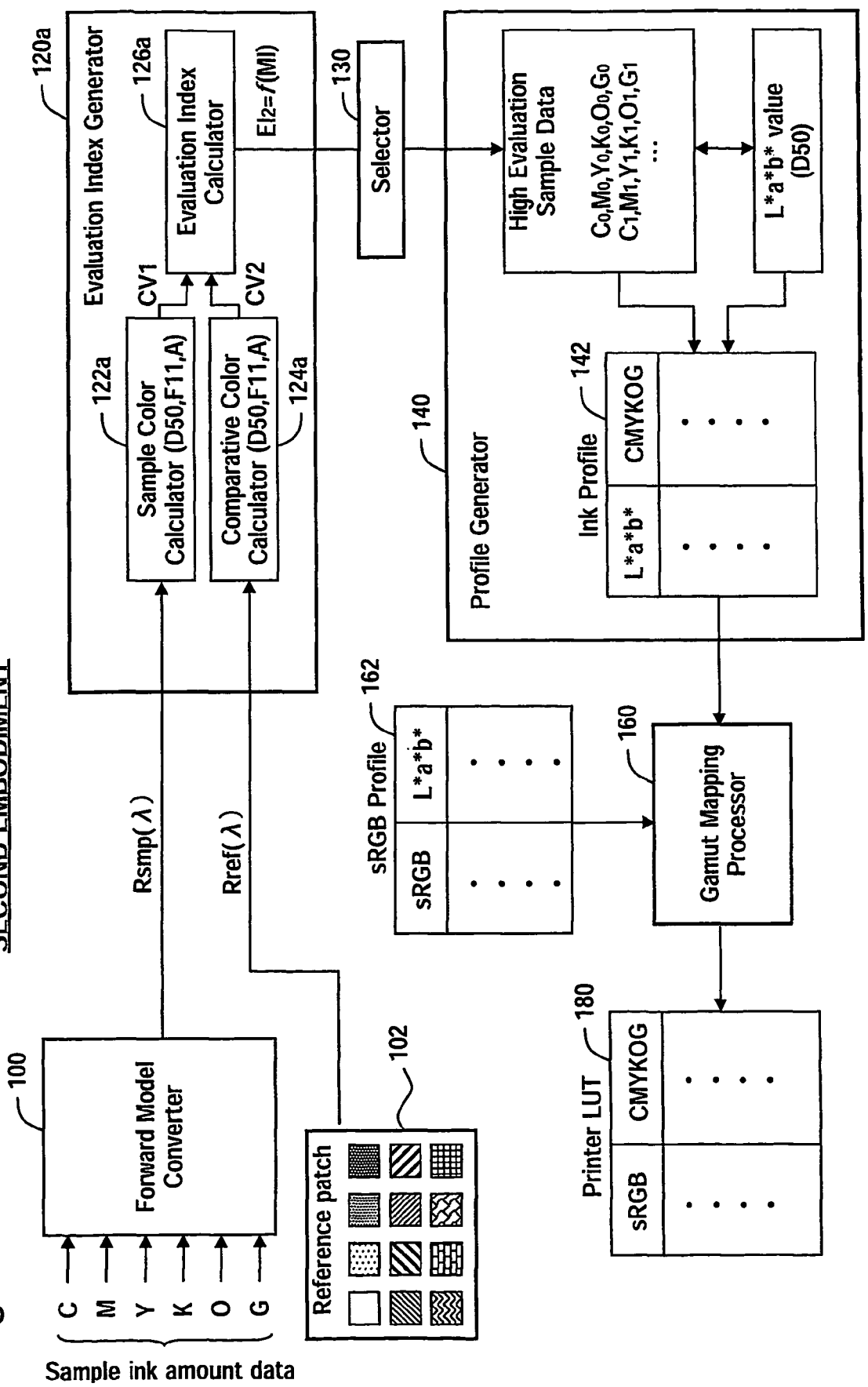
FIG. 9 is a block diagram showing system arrangement in Embodiment 2 of the invention.

FIG. 9 is a block diagram showing the system arrangement in Embodiment 2 of the invention. The differences from the system of Embodiment 1 depicted in FIG. 1 include the use of reference color patches 102 and the use of an index including a metamerism index (described later) rather than a color inconstancy index CII as an evaluation index EI.

Figure 10:
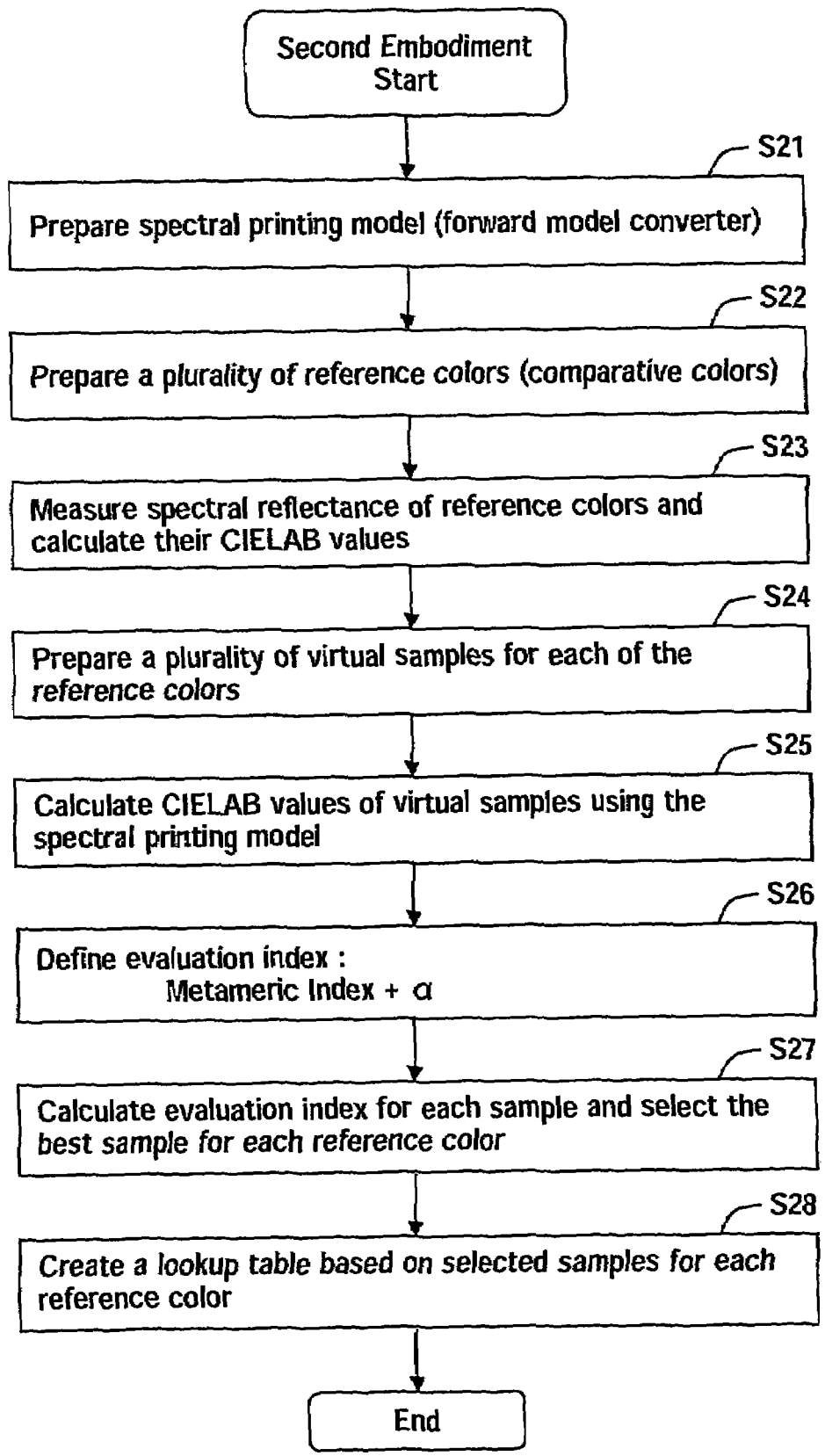
FIG. 10 is a flowchart illustrating the process flow in Embodiment 2.

FIG. 10 is a flowchart illustrating the process flow in Embodiment 2. In Step S21, a spectral printing model is determined and a converter 100 is created. This step is identical to Step S1 in FIG. 2. In Step S22, plural comparative colors are prepared. In the example of FIG. 9, reference color patches 102 are prepared by way of originals providing plural comparative colors; the spectral reflectance Rref(λ) of these reference color patches 102 are measured by a spectrophotometer, not shown. The reference color patches 102 are original patches including plural color patches. However, plural comparative colors could instead be acquired from a picture, for example, rather than from reference color patches 102. Colors acquired from reference color patches 102 or from a picture are also termed "reference colors." In Step S23, comparative color calculator 124a uses spectral reflectance Rref(λ) of reference colors (comparative colors) to calculate colorimetric values CV2 under plural viewing conditions. In this embodiment, three types of illuminant D50, F11, and A are used as the plural viewing conditions.

In Step S24, a plurality of virtual samples (sample ink amount data) likely to have a high degree of metamerism with the comparative color are prepared for each comparative color. Here, "degree of metamerism" refers to stability of metamerism of a pair of subject colors (a sample color and a comparative color) observed under a plurality of different illuminants (so-called illuminant metamerism). In Step S25, colorimetric values CV1 are calculated for these virtual samples. Specifically, in the same manner as in Embodiment 1, ink amount data for each virtual sample is converted to spectral reflectance Rsmp(λ) by spectral printing model converter 100, and this spectral reflectance Rsmp(λ) is used to calculate colorimetric values CV1 under the same plurality of viewing conditions as those used for the comparative color.

In Step S26, an evaluation index $EI_2$ represented by Equation (5) below is defined.

$$EI_2 = f(MI_i) = k \cdot ave(MI_i) + \alpha \quad (5)$$

Here, the operator ave indicates an operation of taking the average of the expression inside the parentheses; $MI_i$ is the metamerism index under the i-th viewing condition (i.e., under the i-th illuminant); k is a coefficient, and α is another index.

$MI_i$ is given by the following equation, for example.

$$MI_i = \left[\left(\frac{\Delta L^*}{2S_L}\right)^2 + \left(\frac{\Delta C^*_{ab}}{2S_C}\right)^2 + \left(\frac{\Delta H^*_{ab}}{S_H}\right)^2\right]^{1/2} \quad (6)$$

This metamerism index represents the color difference between the sample color and the comparative color under the i-th illuminant. The color difference is taken after a parameric correction is applied to match the sample and comparative color under the reference viewing conditions. The first right-hand term in Equation (5) can be understood as an index representing a degree of illuminant metamerism. Regarding metamerism index; see Billmeyer and Saltzman's Principles of Color Technology, 3rd edition, John Wiley & Sons Inc. 2000, p. 127, and pp. 213-215.

As will be apparent from comparison with Equation (2) given earlier, the same color difference equation as that giving CII can be used as the equation yielding MI. The difference between MI and CII is that the former represents the difference in color of two subject colors observed under the same viewing condition, whereas the latter represents the difference in color of one subject color observed under different viewing conditions. Equations other than Equation (6) can be used as the color difference equation for calculating MI. Any other index can be used as the second term α in the right-hand term of Equation (5), or α may be omitted as well.

In Step S27, evaluation index generator 120a calculates an evaluation index $EI_2$ for each sample, and selector 130 selects the best sample for each reference color with reference to this evaluation index $EI_2$. In Step S28, the sample selected for each reference color is used to generate an ink profile 142 and a printer lookup table 180. This step S28 is a process substantially identical to that of Steps S7-S9 in FIG. 2. As a lookup table for faithfully reproducing a picture, it would also be possible to create a table having, for example, the color numbers of the picture colors as input and ink amounts as output. In this case, the interpolation calculations of Steps S7, S8 and the gamut mapping of Step S9 may be dispensed with.

In this way, in Embodiment 2, using an evaluation index $EI_2$ that includes a metamerism index MI, data having a high rating value is selected from among sample ink amount data, and an ink profile is created on the basis of the selected sample ink amount data. As a result, it is possible to create a color conversion profile which, when used in a printer, is capable of yielding a printout of a color having little color difference from a reference color under various different viewing conditions.

The quality of a printout reproduced using the profile thus prepared may be evaluated by means of an index representing differences between spectral reflectance values, such as RMS. RMS is the root mean square of the difference between two spectral reflectance values. The difference between the two spectral reflectance values is calculated on a predetermined wavelength band-by-wavelength band basis (e.g., every 5 nm or 10 nm).

C. EMBODIMENT 3

Figure 11:
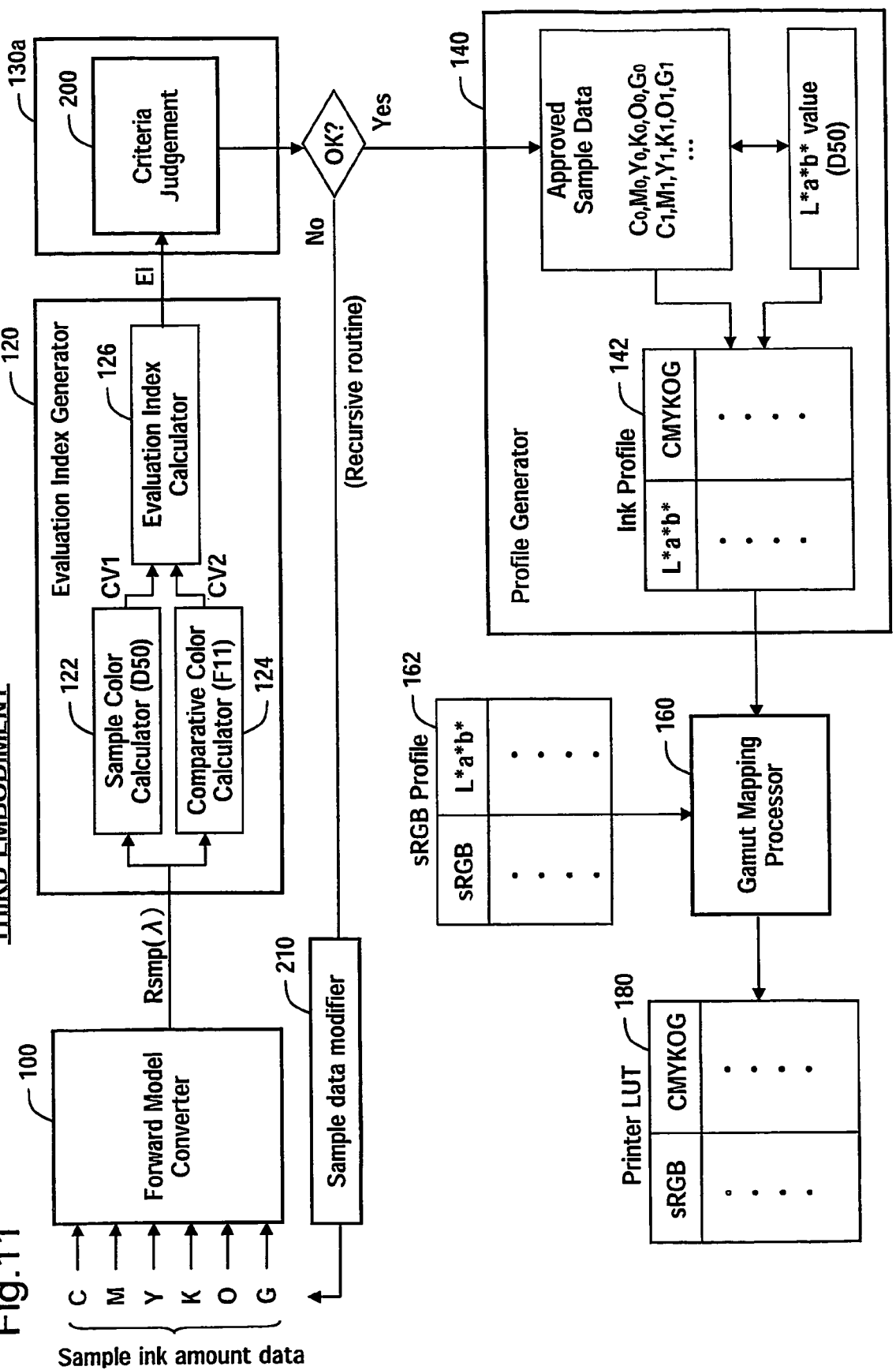
FIG. 11 is a block diagram showing the overall system arrangement in Embodiment 3 of the invention.

FIG. 11 is a block diagram showing the system arrangement in Embodiment 3 of the invention. Significant differences from the system of Embodiment 1 depicted in FIG. 1 are that selector 130a includes a criteria judgment section 200, and a sample data modifier 210 has been added. In Embodiment 3, in the event that a certain sample does not meet predetermined evaluation criteria, the sample data modifier 210 modifies the sample ink amount data and recalculates an evaluation index EI for the modified sample ink amount data. A color conversion profile is then created using samples that meet the evaluation criteria.

Figure 12:
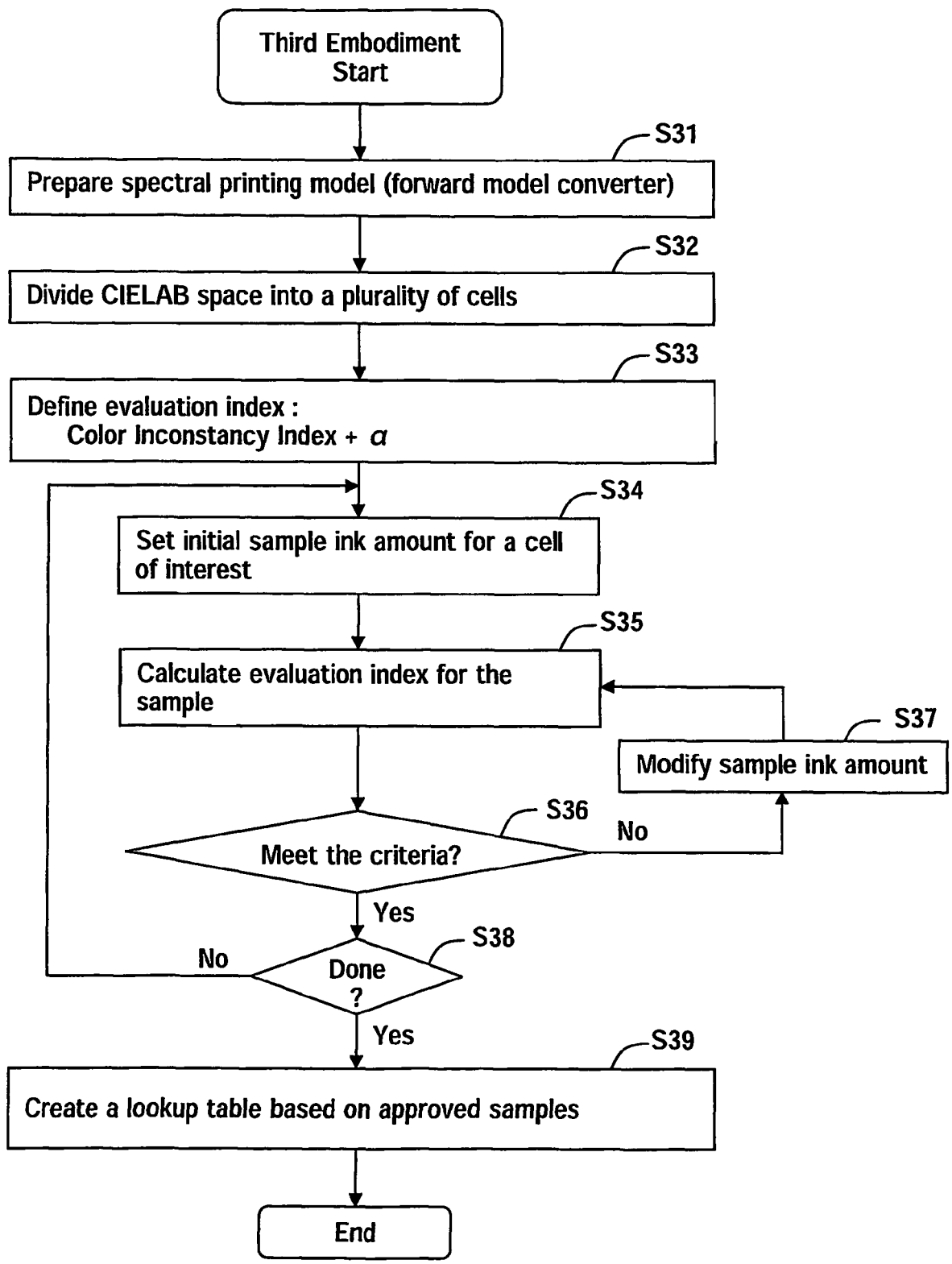
FIG. 12 is a flowchart illustrating process flow in Embodiment 4.

FIG. 12 is a flowchart illustrating process flow in Embodiment 3. In Step S31, a spectral printing model is prepared. This Step S31 is the same as Step S1 in FIG. 2. In Step S32, the CIELAB color space is divided into a plurality of cells. Here, the same 16×16×16 cell division as used in Step S4 in Embodiment 1 may be employed.

In Step S33, an evaluation index EI for determining the quality of a sample is defined. Embodiment 3 employs the evaluation index $EI_1=f(CII)$ of Embodiment 1. However, the evaluation index $EI_2=f(MI)$ of Embodiment 2 can be used instead.

Steps S34 to S37 are a recursive routine for selecting one representative sample for each cell. In Step S34, one cell in the CIELAB color space is selected as the target for processing (target cell), and initial sample ink amount data is set for the target cell. For this initial sample ink amount data, the colorimetric value (L*a*b* value) of the sample color to be printed according to the ink amount data is within the target cell. The colorimetric value of the sample color is calculated under a first viewing condition (for example, illuminant D50 and CIE 1931 2° Standard Observer). In the event that the colorimetric value of the set initial sample ink amount data is not inside the target cell, the initial sample ink amount data is modified until the measured value is within the target cell.

Depending on the cell, in some instances, there may be no ink amount data that gives a colorimetric value within the cell. For example, the color of a cell having high lightness or low lightness and high chroma may not be reproducible. In such an instance, the cell is excluded from target processing so as to be excluded from subsequent processing.

In Step S35, evaluation index generator 120 calculates an evaluation index EI for the initial sample ink amount data. This evaluation index EI may be calculated according to Equation (4) given earlier, for example. In Step S36, criteria judgment section 200 judges whether the evaluation index EI meets predetermined evaluation criteria. Evaluation criteria may be given by the following Equation (7), for example.

$$EI \leq \delta \qquad (7)$$

Here, δ is the upper permissible limit for evaluation index EI.

Where Equation (7) is used, criteria is judged to be met when evaluation index EI does not exceed the upper permissible limit δ. Alternatively, rather than using a single evaluation index EI, a plurality of evaluation indices could be calculated for a single set of sample ink amount data, and the sample ink amount data judged to meet the evaluation criteria when all of the evaluation indices meet the criteria.

In the event that initial sample ink amount data does not meet evaluation criteria, in Step S37, sample data modifier 210 modifies the initial sample ink color data. In preferred practice, several restrictive conditions such as the following will be imposed as regards the modified sample ink amount data.

(Restrictive condition 1): the colorimetric value given by the sample ink amount data subsequent to modification shall be within the target cell.

(Restrictive condition 2): the ink amount represented by sample ink amount data subsequent to modification shall meet the ink duty limit.

Restrictive condition 1 is required in order to calculate a representative sample for a target cell. Restrictive condition 2 ensures that the modified sample ink amount data represents an ink amount that can be used in actual printing. Ink duty limit refers to an amount of ink ejectable onto a print medium per unit of surface area thereof, and is predetermined with reference to the type of print medium, and also based on consideration of ink bleed. A typical ink duty limit will include a maximum value of ink amount for each ink, as well as a maximum value of total ink amount for all inks. Additional restrictive conditions besides the aforementioned Restrictive conditions 1, 2 may be imposed as well.

Once sample ink amount data has been modified in the above manner, the process of Steps S35, S36 is again executed using the modified sample ink amount data. In this way, the processes of Steps S35-S37 are executed recursively, and the sample meeting the evaluation criteria is selected as the representative sample for the target cell. It is conceivable that a sample meeting the evaluation criteria may be impossible to obtain even when recursive processes are carried out a predetermined number of times for a given target cell. In such an instance, from among the plurality of samples examined in relation to the particular target cell, the sample that comes closest to meeting the evaluation criteria (sample with the best rating mdex) may be selected as the representative sample. Alternatively, no representative sample may be selected for the target cell.

In Step S38, it is determined whether processing has been completed for all cells, and if not completed the routine returns to Step S34, and initiates processing for the next cell. When processing for all cells has been completed in this way, in Step S39, the selected representative samples are used to create ink profile 142 and printer lookup table 180. The process of Step S39 is the same as that of Steps S7-S9 in FIG. 2.

In Embodiment 3 described hereinabove, the color space of predetermined colorimetric values (in the preceding example, the CIELAB color space) is divided into a plurality of cells, a representative sample that meets certain evaluation criteria is searched for using a recursive process on a cell-by-cell basis, and the representative samples are used to create a profile and lookup table. Accordingly, the number of cells including no actual sample can be reduced as compared to Embodiment 1. As a result, it is possible to obtain a printer lookup table 180 having a wider gamut. It is also possible to obtain a printer lookup table 180 that is superior in terms of color reproduction characteristics as well.

D. EXAMPLE OF SPECTRAL PRINTING MODEL

The cellular Yule-Nielsen spectral Neugebauer model, an example of a spectral printing model, is now described. This model is based on the well-known spectral Neugebauer model and Yule-Nielsen model. The following description assumes a model that employs the three inks CMY, but the model can readily be expanded to one using an arbitrary number of inks. The cellular Yule-Nielsen spectral Neugebauer model is described by Wyble and Berns, Color Res. Appl., 25, 4-19, 2000, the disclosure of which is incorporated herein by reference for all purposes.

Figure 13A:
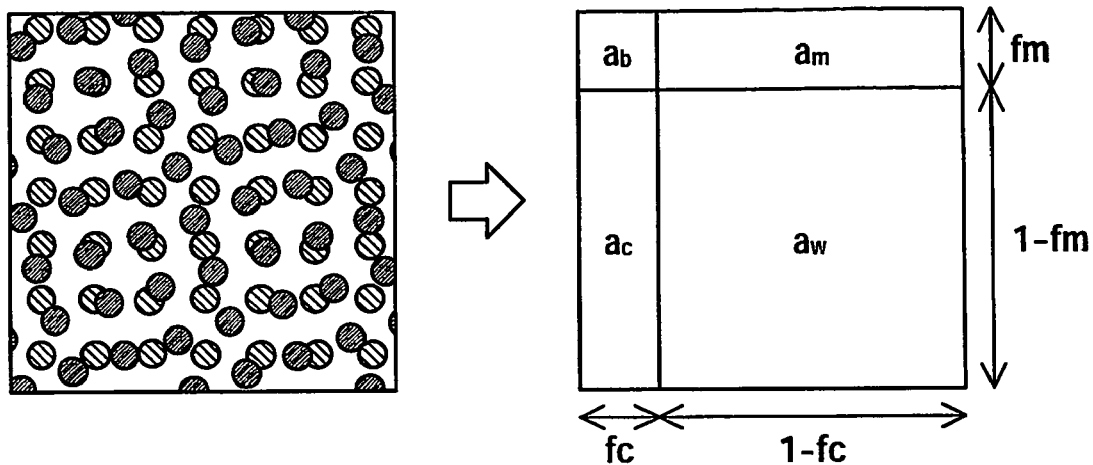
FIGS. 13(A) and 13(B) illustrate the Spectral Neugebauer model.

FIG. 13 illustrates the spectral Neugebauer model. In the spectral Neugebauer model, the spectral reflectance R(λ) of any printout is given by Equation (8) below.

$$R(\lambda) = a_w R_w(\lambda) + a_c R_c(\lambda) + a_m R_m(\lambda) + \\ a_y R_y(\lambda) + a_r R_r(\lambda) + a_g R_g(\lambda) + a_b R_b(\lambda) + a_k R_k(\lambda) \quad (8)$$

$a_w = (1-f_c)(1-f_m)(1-f_y)$ $a_c = f_c(1-f_m)(1-f_y)$ $a_m = (1-f_c)f_m(1-f_y)$ $a_y = (1-f_c)(1-f_m)f_y$ $a_r = (1-f_c)f_m f_y$ $a_g = f_c(1-f_m)f_y$ $a_b = f_c f_m (1-f_y)$ $a_k = f_c f_m f_y$

Here, $a_i$ is the planar area percentage of the i-th area, and $R_i(\lambda)$ is the spectral reflectance of the i-th area. The subscripts w, c, m, y, r, g, b and k respectively denote an area of no ink (w), an area of cyan ink only (c), an area of magenta ink only (m), an area of yellow ink only (y), an area onto which magenta ink and yellow ink have been ejected (r), an area onto which yellow ink and cyan ink have been ejected (g), an area onto which cyan ink and magenta ink have been ejected (b), and an area onto which all three inks CMY have been ejected (k). $f_c$, $f_m$ and $f_y$ denote the percentage of area covered by ink (termed "ink area coverage") when only one of the CMY inks is ejected. The spectral reflectance $R_i(\lambda)$ can be determined by measuring a color patch with a spectrophotometer.

Figure 13B:
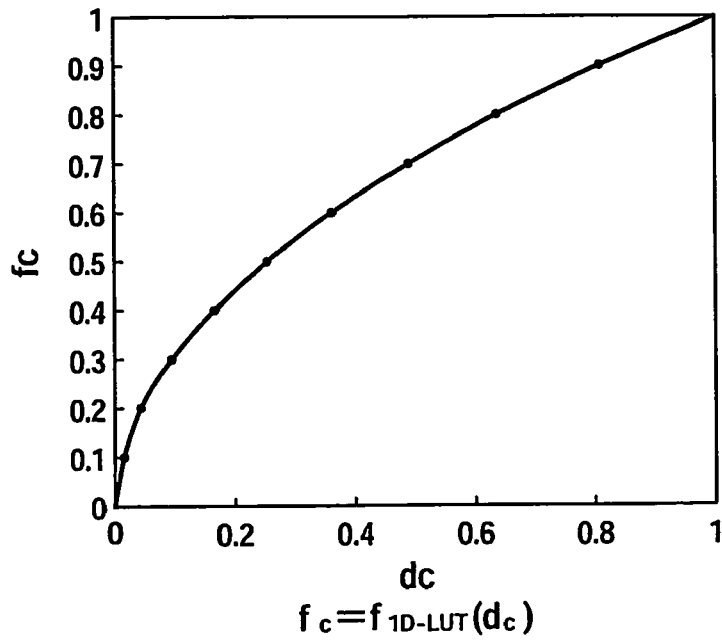

Ink area coverage $f_c$, $f_m$, $f_y$ is given by the Murray-Davies model shown in FIG. 13(B). In the Murray-Davies model, ink area coverage $f_c$ of cyan ink, for example, is a nonlinear function of the cyan ink ejection amount $d_c$, and is given by a one-dimensional lookup table. The reason that ink area coverage is a nonlinear function of ink ejection amount is that when a small amount of ink is ejected onto a unit of planar area, there is ample ink spread, whereas when a large amount is ejected, the ink overlaps so that there is not much increase in the covered area due to ink spread.

Where the Yule-Nielsen model is applied in relation to spectral reflectance, Equation (8) above can be rewritten as Equation (9a) or Equation (9b) below.

$$R(\lambda)^{1/n} = a_w R_w(\lambda)^{1/n} + a_c R_c(\lambda)^{1/n} + a_m R_m(\lambda)^{1/n} + \\ a_y R_y(\lambda)^{1/n} + a_r R_r(\lambda)^{1/n} + a_g R_g(\lambda)^{1/n} + \\ a_b R_b(\lambda)^{1/n} + a_k R_k(\lambda)^{1/n} \quad (9a)$$

$$R(\lambda) = \{a_w R_w(\lambda)^{1/n} + a_c R_c(\lambda)^{1/n} + a_m R_m(\lambda)^{1/n} + \\ a_y R_y(\lambda)^{1/n} + a_r R_r(\lambda)^{1/n} + a_g R_g(\lambda)^{1/n} + \\ a_b R_b(\lambda)^{1/n} + a_k R_k(\lambda)^{1/n}\}^2 \quad (9b)$$

Here, n is a predetermined coefficient equal to 1 or greater, e.g., n=10. Equation (9a) and Equation (9b) are equations representing the cellular Yule-Nielsen spectral Neugebauer model.

The cellular Yule-Nielsen spectral Neugebauer model is obtained by dividing the ink color space of the Yule-Nielsen spectral Neugebauer model described above into a plurality of cells.

Figure 14A:
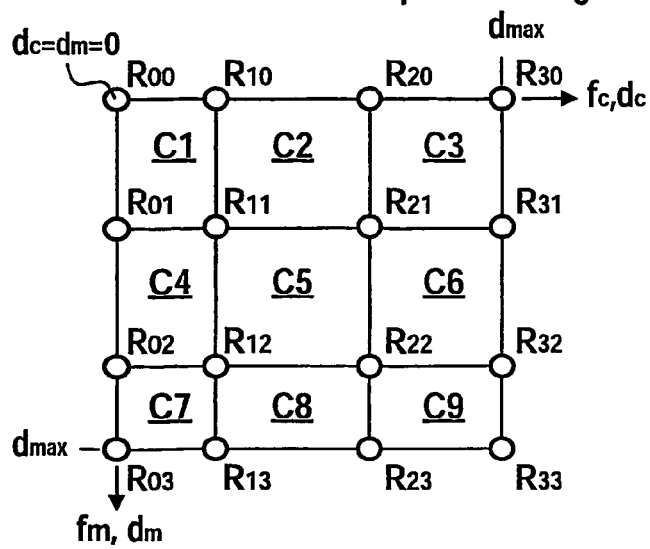
FIGS. 14(A)-14(C) illustrate the Cellular Yule-Nielsen Spectral Neugebauer model.

FIG. 14(A) shows an example of cell division in the cellular Yule-Nielsen spectral Neugebauer model. Here, for simplicity, cell division is portrayed in a two-dimensional space including two axes, namely, for cyan ink area coverage $f_c$ and magenta ink area coverage $f_m$. The axes $f_c$, $f_m$ may also be thought of as axes representing ink ejection amounts $d_c$, $d_m$. The white circles denote grid points (termed "nodes"); the two-dimensional space is divided into nine cells C1-C9. Spectral reflectances $R_{00}$, $R_{10}$, $R_{20}$, $R_{30}$, $R_{01}$, $R_{11}$ ... $R_{33}$ are predetermined for the printout (color patch) at each of the 16 nodes.

Figure 14B:
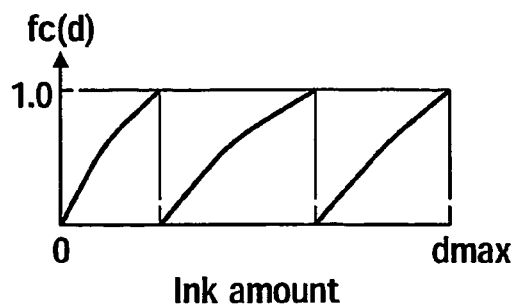

FIG. 14(B) shows ink area coverage $f_c(d)$ corresponding to this cell division. Here, the ink amount range for a single ink 0-dmax is divided into three intervals; ink area coverage $f_c(d)$ is represented by a curve that increases monotonically from 0 to 1 in each interval.

Figure 14C:
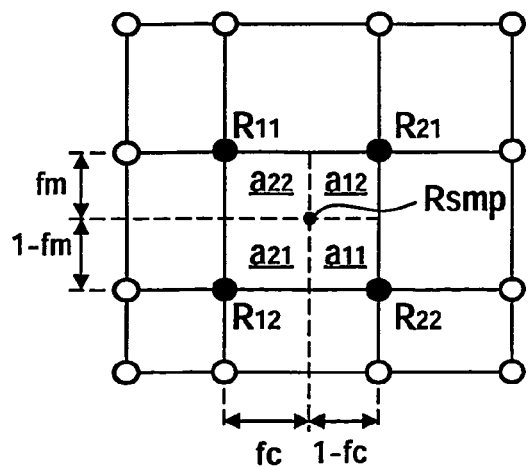

FIG. 14(C) shows calculation of spectral reflectance Rsmp($\lambda$) for the sample in cell C5 located at center in FIG. 14(A). Spectral reflectance Rsmp($\lambda$) is given by Equation (10) below.

$$Rsmp(\lambda) = \left(\sum a_i R_i(\lambda)^{1/n}\right)^n \quad (10)$$
$$= (a_{11} R_{11}(\lambda)^{1/n} + a_{12} R_{12}(\lambda)^{1/n} + \\ a_{21} R_{21}(\lambda)^{1/n} + a_{22} R_{22}(\lambda)^{1/n})^2$$

$a_{11} = (1-f_c)(1-f_m)$ $a_{12} = (1-f_c)f_m$ $a_{21} = f_c(1-f_m)$ $a_{22} = f_c f_m$

Here, ink area coverages $f_c$, $f_m$ are values given by the graph in FIG. 14(B) and defined within cell C5. Spectral reflectances $R_{11}(\lambda)$, $R_{12}(\lambda)$, $R_{21}(\lambda)$, $R_{22}(\lambda)$ at the four apices of cell C5 are adjusted according to Equation (10) so as to correctly give sample spectral reflectance Rsmp($\lambda$).

By dividing the ink color space into a plurality of cells in this way, the spectral reflectance Rsmp($\lambda$) of a sample can be calculated more precisely as compared to the case where it is not so divided. FIG. 15 shows node values for cell division employed in one working example. As shown in lo this example, node values for cell division are preferably defined independently on an ink-by-ink basis.

Figure 16:
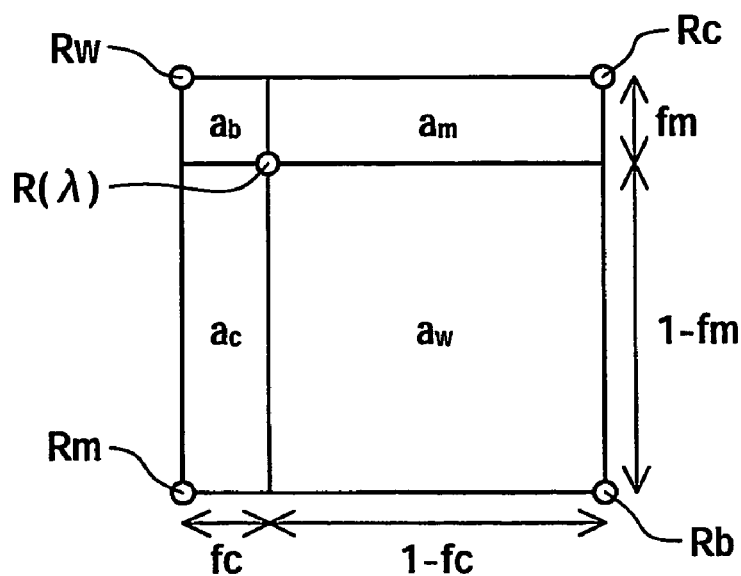
FIG. 16 shows a cellular model.

In the model shown in FIG. 14(A), it is normal that the spectral reflectance at all nodes cannot be derived through color patch measurement. The reason is that when a large amount of ink ejected, bleeding occurs so 15 that it is not possible to print a color patch of uniform color. FIG. 16 shows the cellular model. This example pertains to a case where only two inks, namely, cyan and magenta, are used. Spectral reflectance R($\lambda$) of any color patch printed with the two inks cyan and magenta is given by Equation (11) below.

$$R(\lambda)^{1/n} = a_w R_w(\lambda)^{1/n} + a_c R_c(\lambda)^{1/n} + a_m R_m(\lambda)^{1/n} + \\ a_b R_b(\lambda)^{1/n} \quad (11)$$

$a_w = (1-f_c)(1-f_m)$ $a_c = f_c(1-f_m)$ $a_m = (1-f_c)f_m$ $a_b = f_c f_m$

Let it be assumed that, of the plural parameters included in Equation (11), the only unknown is spectral reflectance Rb(λ) with both cyan ink and magenta ink at 100% ejection amount, with values for all other parameters being known. Here, modifying Equation (11) gives Equation (12).

$$R_b(\lambda) = \left\{ \frac{R(\lambda)^{1/n} - a_w R_w(\lambda)^{1/n} - a_c R_c(\lambda)^{1/n} - a_m R_m(\lambda)^{1/n}}{a_b} \right\}^n \quad (12)$$

As noted, all of the right-hand terms are known. Accordingly, by solving Equation (12) it is possible to calculate the unknown spectral reflectance $R_b(\lambda)$. Regarding estimation of the spectra of nonprintable colors, see R Balasubramanian, "Optimization of the spectral Neugebauer model for printer characterization", J. Electronic Imaging 8(2), 156-166 (1999), the disclosure of which is incorporated herein by reference for all purposes.

The spectral reflectance of second-order colors other than cyan+magenta color can be calculated in the same manner. Additionally, where a plurality of second-order color spectral reflectance values are calculated, a plurality of third-order color spectral reflectance values can be calculated in the same manner. By sequentially calculating spectral reflectances of higher order colors in this way, it is possible to calculate the spectral reflectance at each node in a cellular ink color space.

The spectral printing converter 100 shown in FIG. 1 may be designed to have spectral reflectance at each node in a cellular ink color space like that in FIG. 14(A), and one-dimensional lookup tables indicating ink area coverage values as shown in FIG. 14(C), these being used to calculate spectral reflectance Rsmp(λ) corresponding to any set of sample ink amount data.

Typically, the spectral reflectance of a printed color patch is dependent upon ink set and the printing medium. Accordingly, a spectral printing model converter 100 like that in FIG. 1 may be created for each combination of ink set and printing medium. Likewise, ink profiles 142 and printer lookup tables 180 may be created for each combination of ink set and printing medium.

E. VARIANT EXAMPLES

E1. Variant Example 1

In the embodiments described hereinabove, six inks, namely, CMYKOG, were used, but the ink types are not limited to these, it being possible to use any plural number of inks. However, the use of inks having colors, such as orange ink, green ink, red ink, blue ink or any other spot color ink, that provides the advantage of a greater degree of freedom as to the shape of spectral reflectance that can be reproduced is preferred.

E2. Variant Example 2

In Embodiments 1 and 2 the color space of colorimetric values is divided into plural cells, and a representative sample which has the best evaluation index EI within a cell is selected, whereas in Embodiment 3 a representative sample is determined by optimizing a sample for each cell until the evaluation index EI meets evaluation criteria. However, the method of selecting a plurality of representative samples for use in creating a color conversion profile is not limited to the above-described methods; generally, selection of a plurality of representative samples on the basis of an evaluation index EI is possible. For example, it is possible to select a plurality of representative samples without dividing the color space of measured values into plural cells. Specifically, a plurality of grid points (nodes) can be defined within the color space of measured values, and samples meeting predetermined evaluation criteria in proximity to the nodes may be selected as representative samples for the nodes.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A method of producing a profile defining correspondence between colorimetric value data and ink amount data representing a set of ink amounts of plural inks usable by a printer, comprising the steps of:
    (a) providing a spectral printing model converter configured to convert ink amount data to spectral reflectance of a color patch to be printed according to the ink amount data;
    (b) providing a plurality of sample ink amount data each representing a set of ink amounts of plural inks;
    (c) converting each sample ink amount data into spectral reflectance of a virtual sample patch to be printed with the ink amounts represented by the sample ink amount data using the spectral printing model converter;
    (d) calculating an evaluation index for each sample ink amount data, the evaluation index including a color difference index representing a color difference between a sample color which is calculated from the spectral reflectance and a comparative color which is selected as a basis for comparison;
    (e) selecting plural sample ink amount data based on the evaluation index; and
    (f) producing a profile defining correspondence between colorimetric value data and ink amount data based on the selected plural sample ink amount data,
    wherein the step (d) includes the steps of:
    calculating a first colorimetric value of the virtual sample color patch under a first viewing condition as a colorimetric value of the sample color;
    calculating a second colorimetric value of the virtual sample color patch under a second viewing condition as a colorimetric value of the comparative color; and
    calculating the color difference index from the first and second colorimetric values, and
    wherein each of steps (c) through (f) is executed by a profile producing apparatus.

2. A method according to claim 1, wherein the step of calculating the color different index includes the steps of:
    converting the first and second colorimetric values into first and second corresponding colorimetric values of corresponding colors for the sample color and the comparative color under a common viewing condition; and
    calculating as the color different index a color difference between the first and second corresponding colorimetric values.

3. A method according to claim 1, wherein
    the step (d) includes calculating a colorimetric value of the virtual sample color patch in a specific color space with respect to each sample ink amount data,
    and the step (e) includes:
    dividing the specific color space into a plurality of cells;
    selecting cells each including at least one colorimetric value for at least one sample ink amount data; and selecting one sample ink amount data for each of the selected cells of the specific color space based on the evaluation index.

4. A method according to claim 1, wherein
the step (e) includes the steps of:
judging whether the evaluation index of one sample ink amount data satisfies a predetermined criterion;
when the evaluation index of the sample ink amount data does not satisfy the predetermined criterion, repeating (i) modifying the sample ink amount data, and (ii) calculating the evaluation index for the modified sample ink amount data, until the evaluation index of the modified sample ink amount data satisfies the predetermined criterion; and
selecting the sample ink amount data whose evaluation index satisfies the predetermined criterion.

5. An apparatus for producing a profile defining correspondence between colorimetric value data and ink amount data representing a set of ink amounts of plural inks usable by a printer, comprising:
- a spectral printing model converter for converting ink amount data to spectral reflectance of a color patch to be printed according to the ink amount data, the spectral printing model converter converting each of a plurality of sample ink amount data into spectral reflectance of a virtual sample patch to be printed with the ink amounts represented by the sample ink amount data;
- an evaluation index generator for calculating an evaluation index for each sample ink amount data, the evaluation index including a color difference index representing a color difference between a sample color which is calculated from the spectral reflectance and a comparative color which is selected as a basis for comparison;
- a selector for selecting plural sample ink amount data based on the evaluation index; and
- a profile generator for producing a profile defining correspondence between colorimetric value data and ink amount data based on the selected plural sample ink amount data,
wherein the evaluation index generator calculates a first colorimetric value of the virtual sample color patch under a first viewing condition as a colorimetric value of the sample color, calculates a second colorimetric value of the virtual sample color patch under a second viewing condition as a colorimetric value of the comparative color, and calculates the color difference index from the first and second colorimetric values.

6. A printing method comprising the steps of:
preparing a lookup table for converting color image data to ink amount data, based on a profile which is produced according to any one of claims 1, 2, 3, and 4;
converting given color image data to ink amount data with the profile;
halftone processing the ink amount data to produce print data; and printing an image according to the print data.

* * * * *